US011906650B2

(12) United States Patent
Yamanouchi

(10) Patent No.: US 11,906,650 B2
(45) Date of Patent: Feb. 20, 2024

(54) OBJECT DETECTION APPARATUS, OBJECT DETECTION METHOD, AND COMPUTER-READABLE RECORDING MEDIUM

(71) Applicant: NEC CORPORATION, Tokyo (JP)

(72) Inventor: Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 632 days.

(21) Appl. No.: 16/982,232

(22) PCT Filed: Mar. 19, 2018

(86) PCT No.: PCT/JP2018/010755
§ 371 (c)(1),
(2) Date: Sep. 18, 2020

(87) PCT Pub. No.: WO2019/180767
PCT Pub. Date: Sep. 26, 2019

(65) Prior Publication Data
US 2021/0033699 A1 Feb. 4, 2021

(51) Int. Cl.
*G01S 7/35* (2006.01)
*G01S 7/41* (2006.01)
(Continued)

(52) U.S. Cl.
CPC .............. *G01S 7/354* (2013.01); *G01S 7/411* (2013.01); *G01S 13/003* (2013.01); *G01S 13/343* (2013.01); *G01S 13/89* (2013.01)

(58) Field of Classification Search
CPC ........ G01S 7/354; G01S 7/411; G01S 13/003; G01S 13/343; G01S 13/89; G01S 13/42
See application file for complete search history.

(56) References Cited

U.S. PATENT DOCUMENTS 9,035,820 B2 * 5/2015 Shiba ................. G01S 13/4418
342/107
10,788,568 B1 * 9/2020 Loui ................... G01S 13/0209
(Continued)

FOREIGN PATENT DOCUMENTS

JP 2000-131409 A 5/2000
JP 3977751 B2 9/2007
(Continued)

OTHER PUBLICATIONS

International Search Report for PCT/JP2018/010755 dated, May 22, 2018 (PCT/ISA/210).
(Continued)

*Primary Examiner* — Donald H B Braswell
(74) *Attorney, Agent, or Firm* — Sughrue Mion, PLLC

(57) ABSTRACT

An object detection apparatus 1000 is provided with: a transmission unit 1101 that emits a radio wave as a transmission signal toward a target 1003 object; a reception unit 1102 that receives, through receiving antennas, radio waves reflected by the object as reception signals, and that generates, for each reception signal received by the respective receiving antennas, using the reception signals, an intermediate frequency signal; and an arithmetic device 1211 that decides sampling times so as to suppress generation of a virtual image by a beam pattern obtained by synthesizing the respective intermediate frequency signals, and generates an intermediate frequency signal for target position detection by performing sampling on the intermediate frequency signals at the decided sampling times, and detects the target using the intermediate frequency signals for position detection.

17 Claims, 15 Drawing Sheets

(51) Int. Cl.
*G01S 13/00* (2006.01)
*G01S 13/89* (2006.01)
*G01S 13/34* (2006.01)

(56) References Cited

U.S. PATENT DOCUMENTS

| | | | |
|---|---|---|---|
| 2017/0307729 A1* | 10/2017 | Eshraghi | G01S 7/2813 |
| 2017/0336450 A1 | 11/2017 | Cornic et al. | |
| 2018/0267157 A1* | 9/2018 | Guruprasad | G01S 17/006 |
| 2018/0348341 A1* | 12/2018 | Phelan | G01S 7/023 |
| 2020/0300965 A1* | 9/2020 | Wu | G01S 7/2883 |

FOREIGN PATENT DOCUMENTS

| | | |
|---|---|---|
| JP | 4653910 B2 | 3/2011 |
| JP | 2011-513721 A | 4/2011 |
| JP | 5080795 B2 | 11/2012 |
| JP | 2013-528788 A | 7/2013 |
| JP | 2015-14611 A | 1/2015 |
| JP | 2015-36682 A | 2/2015 |
| JP | 2015-230216 A | 12/2015 |
| WO | 2018/025421 A1 | 2/2018 |

OTHER PUBLICATIONS

Written Opinion of the International Searching Authority dated Sep. 22, 2020, in International Application No. PCT/JP2018/010755.

* cited by examiner

OBJECT DETECTION APPARATUS, OBJECT DETECTION METHOD, AND COMPUTER-READABLE RECORDING MEDIUM

CROSS REFERENCE TO RELATED APPLICATIONS

This application is a National Stage of Application No. PCT/JP2018/010755 filed Mar. 19, 2018 the disclosure of which is incorporated herein in its entirety by reference.

TECHNICAL FIELD

The present invention relates to an object detection apparatus for emitting a radio wave to a detection target and recognizing or identifying the presence of the detection target by detecting a radio wave reflected or emitted from the target, and an object detection method, and further relates to a computer-readable recording medium where a program for realizing these is recorded.

Radio waves (microwaves, millimeter waves, terahertz waves, and the like) are superior to light in terms of their ability to pass through objects. Apparatus that utilize this penetration ability of radio waves in order to visualize articles under clothes or in a bag to perform inspection have been put into practical use. Also, remote sensing technology, which utilizes the penetration ability of radio waves in order to visualize the ground surface from satellites or aircraft by the radio waves passing through clouds, has also been put into practical use.

Several systems have been proposed in imaging devices (object detection apparatus) using radio waves. One of these is an array antenna system, which is shown in a concept diagram in FIG. 12. FIG. 12 is a concept diagram showing the concept of a common array antenna system. As shown in FIG. 12, in the array antenna system, a measurement device includes a transmitter 211 and a receiver 201.

Also, as shown in FIG. 12, the transmitter 211 includes a transmission antenna 212. Also, the receiver 201 includes receiving antennas $202_1, 202_2, \ldots, 202_N$ (where N is the number of receiving antennas).

The transmitter 211 emits an RF signal (radio wave) 213 from the transmission antenna 212 toward detection targets $204_1, 204_2, \ldots, 204_K$ (where K is the number of targets). The RF signal (radio wave) 213 is reflected at the detection targets $204_1, 204_2, \ldots, 204_K$, thus respectively generating reflection waves $203_1, 203_2, \ldots, 203_K$. The generated reflection waves $203_1, 203_2, \ldots, 203_K$ are received by the receiving antennas $202_1, 202_2, \ldots, 202_N$.

The receiver 201 calculates the intensity of the radio waves reflected from the detection targets $204_1, 204_2, \ldots, 204_K$ based on the received reflection waves $203_1, 203_2, \ldots, 203_K$. By converting the distribution of that radio wave intensity to an image, an image of the detection targets $204_1, 204_2, \ldots, 204_K$ can be obtained.

In the array antenna system, as shown in FIG. 13, phase shifters $206_1, 206_2, \ldots, 206_N$ are respectively provided for each of the respective receiving antennas $202_1, 202_2, \ldots, 202_N$ in the receiver 201. FIG. 13 more specifically shows the configuration of the receiver shown in FIG. 12. As shown in FIG. 13, the phase shifters $206_1, 206_2, \ldots, 206_N$ add phase rotations $\Phi_1, \Phi_2, \ldots, \Phi_N$ respectively to incoming waves $208_1, 208_2, \ldots, 208_N$ received by the receiving antennas $202_1, 202_2, \ldots, 202_N$. The incoming waves $208_1, 208_2, \ldots, 208_N$ to which the phase rotations $\Phi_1, \Phi_2, \ldots, \Phi_N$ have been added are added with an adder 207.

The phase shifters $206_1, 206_2, \ldots, 206_N$ and the adder 207 may be implemented with analog circuits, or may be implemented with digital processing by software. In the array antenna system, the directivity of the array antennas is controlled according to setting of the phase rotations $\Phi_1, \Phi_2, \ldots, \Phi_N$ by the phase shifters $206_1, 206_2, \ldots, 206_N$. When the directivity of the receiving antennas 202 is $g(\theta)$, and the amplitude and the phase of an incoming wave $208_n$ (where n=1, 2, ..., N) received by a receiving antenna $202_n$ are $a_n$ and $\theta_n$, respectively, the directivity $E(\theta)$ of the array antennas is calculated by the following Formula (1).

[Formula 1]

$$E(\theta) = g(\theta) \sum_{n=1}^{N} a_n \exp(j\varphi_n) \exp(j\Phi_n) = g(\theta) AF(\theta). \quad (1)$$

Note that the directivity component $AF(\theta)$ obtained by removing the directivity $g(\theta)$ of the receiving antenna 202 from the directivity $E(\theta)$ of the array antenna in Formula (1) is called an array factor. The array factor $AF(\theta)$ represents the effects of directivity due to the formation of the array antenna. The signal received by the receiving antenna $202_n$ (where n=1, 2, ..., N) is expressed as $g(\theta)a_n\exp(\varphi_n)$. A signal $g(\theta)a_n\exp(j\varphi_n)\exp(j\varphi_n)$ obtained by receiving the phase rotation $\Phi_n$ of the phase shifter $206_n$ is added across n=1, 2, ..., N by the adder 207, and this signal is obtained as the directivity $E(\theta)$ of Formula (1).

When the receiving antenna $202_n$ (where n=1, 2, ..., N) receives the incoming wave $208_n$ with an incidence angle $\theta$, the phase $\varphi_n$ of the incoming wave $208_n$ is given as $-2\pi \cdot n \cdot d \cdot \sin \theta / \lambda$ (where n=1, 2, ..., N). Here, d is the interval of the receiving antenna $202_n$ (where n=1, 2, ..., N), and $\lambda$ is the wavelength of the incoming waves $208_1, 208_2, \ldots, 208_N$.

In Formula (1), when the amplitude an is constant regardless of n, if the phase rotation $\Phi_n$ (where n=1, 2, ..., N) of the phase shifter $206_n$ is set to be equal to the phase $\varphi_n$ of the incoming wave $208_n$, the array factor $AF(\theta)$ becomes maximum in the direction of the angle $\theta$. In other words, the directivity of the array antenna is controlled by the phase rotation $\Phi_n$ of the phase shifter $206_n$.

Examples of a radio wave imaging device using an array antenna system are disclosed in Patent Documents 1 to 3.

In the array antenna systems disclosed in Patent Documents 1 and 2, the phase shifters $206_1, 206_2, \ldots, 206_N$ are built into the receiver 201, and connected to the receiving antennas $202_1, 202_2, \ldots, 202_N$. The directivity of the receiving array antenna formed by the receiving antennas $202_1, 202_2, \ldots, 202_N$ is controlled by the phase shifters $206_1, 206_2, \ldots, 206_N$.

That is, by changing the directivity of the receiving array antennas $(202_1, 202_2, \ldots, 202_N)$ formed in a beam shape, and directing the directivity beam of the receiving array antennas $(202_1, 202_2, \ldots, 202_N)$ respectively to the detection targets $204_1, 204_2, \ldots, 204_N$, the intensity of the radio waves reflected from the detection targets $204_1, 204_2, \ldots, 204_N$ is calculated.

In the array antenna system disclosed in Patent Document 3, the frequency dependence of the receiving array antennas $(202_1, 202_2, \ldots, 202_N)$ is used to control the directivity of the receiving array antennas $(202_1, 202_2, \ldots, 202_N)$. In the array antenna system disclosed in Patent Document 3 as well, the intensity of the radio waves reflected from the detection targets $204_1, 204_2, \ldots, 204_N$ is calculated by directing the directivity beam of the receiving array antennas ($202_1$, $202_2$, ..., $202_N$) respectively to the detection targets $204_1$, $204_2$, ..., $204_K$. The array antenna system disclosed in Patent Document 3 has this point in common with the array antenna systems disclosed in Patent Document 1 and Patent Document 2.

Incidentally, in the array antenna system, because a virtual image of the target 204 is suppressed, there is a constraint that the interval between the respective antennas of the receiving antennas $202_1$, $202_2$, ..., $202_N$ needs to be no more than half the wavelength k of the reflection waves $203_1$, $203_2$, ..., $203_N$ received by the receiver 201.

Patent Document 4 discloses a technique of relaxing the constraint on the interval between the receiving antennas $202_1$, $202_2$, ..., $202_N$ in the array antenna system. In Patent Document 4, a plurality of pulse signals with different RF frequencies are transmitted toward a target, and signals of different RF frequencies reflected from the target are received by a plurality of receiving antennas. The pulse signals of different RF frequencies received by those receiving antennas are phase-aligned and then (coherently) synthesized. By such synthesis processing, a virtual antenna can be formed at a position corresponding to an RF frequency, and as a result, the actual receiving antenna interval can be expanded to at least half of the wavelength $\lambda$.

As another system in an imaging device using radio waves, there is a synthetic aperture radar (SAR) system, which is shown in a concept diagram in FIG. 14. FIG. 14 is a concept diagram showing the concept of a common synthetic aperture radar system. As shown in FIG. 14, in the synthetic aperture radar system, a measurement device includes a transmitter 311 and a receiver 301. The transmitter 311 includes a transmission antenna 312. Also, the receiver 301 includes a receiving antenna 302.

The transmitter 311 emits an RF signal (radio wave) 313 from the transmission antenna 312 toward detection targets $304_1$, $304_2$, ..., $304_K$ (where K is the number of targets). The RF signal (radio wave) 313 is reflected at the detection targets $304_1$, $304_2$, ..., $304_K$, thus respectively generating reflection waves $303_1$, $303_2$, ..., $303_K$. In this case, the receiver 301, while moving to the position of receivers $301_1$, $301_2$, ..., $301_N$, receives the reflection waves $303_1$, $303_2$, ..., $303_K$ at the (position of) receiving antennas $302_1$, $302_2$, ..., $302_N$.

Further, in this case, the receiving antennas $302_1$, $302_2$, ..., $302_N$, similarly to the receiving antennas $202_1$, $202_2$, ..., $202_N$ in the array antenna system shown in FIG. 12, form a receiving array antenna (virtual array antenna) with a number N of antennas.

Therefore, similarly to the array antenna system shown in FIG. 12, in the synthetic aperture radar system shown in FIG. 14 as well, the receiver 301 calculates the intensity of the radio waves reflected from the detection targets $304_1$, $304_2$, ..., $304_K$ based on the received reflection waves $303_1$, $303_2$, ..., $303_K$. Also, in the synthetic aperture radar system as well, by converting the distribution of that radio wave intensity to an image, an image of the detection targets $304_1$, $304_2$, ..., $304_K$ can be obtained.

Also, examples of a radio wave imaging device using a synthetic aperture radar system are disclosed in Patent Documents 5 to 7.

LIST OF RELATED ART DOCUMENTS

Patent Documents

Patent Document 1: Japanese Translation of PCT Application No. 2013-528788

Patent Document 2: Japanese Patent Laid-Open Publication No. 2015-014611

Patent Document 3: Japanese Patent No. 5080795

Patent Document 4: Japanese Patent Laid-Open Publication No. 2015-230216

Patent Document 5: Japanese Patent No. 4653910

Patent Document 6: Japanese Translation of PCT Application No. 2011-513721

Patent Document 7: Japanese Patent Laid-Open Publication No. 2015-036682

SUMMARY OF INVENTION

Problems to be Solved by the Invention

Here, problems of the array antenna systems (see FIG. 12) disclosed in the above Patent Documents 1 to 3 will be described. First, a problem with an array antenna system is that as the number of required receiving antennas $202_1$, $202_2$, ..., $202_N$ increases, that is accompanied by an increase in the number N of receivers, which results in increased device cost, size, and weight.

The above problem will be specifically explained below. First, in the case of an array antenna system, there is a condition that the respective antenna intervals of the receiving antennas $202_1$, $202_2$, ..., $202_N$ need to be no more than half the wavelength k of the reflection waves $203_1$, $203_2$, ..., $203_K$ received by the receiver 201. In a case where it is not possible to satisfy this condition, there is a problem that a virtual image is generated at a position where the detection targets $204_1$, $204_2$, ..., $204_K$ are not present in a generated image. In a case where the reflection waves $203_1$, $203_2$, ..., $203_K$ are millimeter waves, the wavelength is about several millimeters, and therefore the antenna interval is extremely small.

Next, in the case of an array antenna system, the image resolution is determined by the directivity beam width $\Delta\theta$ of the receiving array antennas ($202_1$, $202_2$, ..., $202_N$). The width $\Delta\theta$ of the directivity beam of the receiving array antennas ($202_1$, $202_2$, ..., $202_N$) is given by $\Delta\theta$ to $\lambda/D$. Here, D is the aperture size of the receiving array antennas ($202_1$, $202_2$, ..., $202_N$) and corresponds to the distance between the receiving antenna $202_1$ and the receiving antenna $202_N$ that are present at both ends. Therefore, in order to obtain a practical resolution in imaging of an article under clothes or an article in a bag, it is necessary to set the aperture size D of the receiving array antennas ($202_1$, $202_2$, ..., $202_N$) to about several tens of cm to several m.

Thus, the array antenna system has two conditions. That is, the respective antenna intervals of the receiving antennas $202_1$, $202_2$, ..., $202_N$ need to be no more than half the wavelength $\lambda$ (no more than several millimeters), and the distance between the receiving antenna $202_1$ and the receiving antenna $202_N$ that are present at both ends needs to be at least about several tens of cm. Therefore, if an array antenna system is adopted, then the number N of antennas necessary per row is about several hundred antennas.

Also, an imaging device using actual radio waves needs to form a two-dimensional image. Therefore, as shown in FIG. 15, it is necessary to spread a number (quantity) N of the receiving antennas 202 in each of the vertical direction and the horizontal direction, and the total number of antennas necessary is $N^2$. Therefore, the total number of antennas necessary and the number of receivers that accompany them are about tens of thousands. FIG. 15 is a configuration diagram showing an example layout of antennas in an imaging device using a common array antenna system.

In this way, an imaging device using a conventional array antenna system requires a large number of antennas and receivers, and therefore the cost is extremely high. Also, since the antennas are spread over an area of several tens of centimeters square to several meters square, the size and weight of the device become very large.

On the other hand, in the array antenna system disclosed in the above-mentioned Patent Document 4, a plurality of pulse signals with different RF frequencies are transmitted and a virtual antenna is formed at a position corresponding to an RF frequency. Thus, suppression of a virtual image is realized while expanding the interval between actual receiving antennas to at least half of the wavelength λ.

However, in the array antenna system disclosed in above Patent Document 4, there is a problem that the range of RF frequencies must be set wide in order to realize high resolution. Specifically, in the array antenna system disclosed in Patent Document 4, when pulse signals of RF frequencies $f_0, f_1, \ldots, F_N$ are transmitted, and these are received by two receiving antennas installed with an interval d therebetween, a virtual antenna is installed at a position of $d \cdot f_n/f_0$ (where n=0, 1, ..., N). The effective aperture size D at this time is $d \cdot (f_N - f_0)/f_0$. From the effective aperture size D, the angular resolution $\Delta\theta$ is given by the following Formula (2).

[Formula 2]

$$\Delta\theta \cong \frac{\lambda}{D} = \frac{\lambda}{d} \cdot \frac{f_0}{f_N - f_0}, \quad (2)$$

As can be seen from the above Formula (2), in order to obtain a good angular resolution $\Delta\theta$, it is necessary to adopt a large RF frequency setting range $f_N - f_0$. However, due to the constraint of the radio wave method, it is difficult to adopt a large RF frequency setting range $f_N - f_0$, and the value of $f_0/(f_N - f_0)$ is usually about 10 to 100. Here, it is assumed that the receiving antenna interval d in the system of Patent Document 4 is the same as the aperture size D of the array antenna system disclosed in Patent Documents 1 to 3. In this case, the angular resolution in the array antenna system disclosed in Patent Document 4 is $f_0/(f_N - f_0)$ times the angular resolution of the array antenna system disclosed in Patent Documents 1 to 3. In other words, the angular resolution deteriorates by about 10 to 100 times.

Further, in the array antenna system disclosed in Patent Document 4, a pulse signal is used, but in order to obtain distance resolution, it is necessary to set the RF bandwidth of the pulse signal to several hundred MHz to several GHz. In addition, in the pulse radar system adopted in Patent Document 4, the bandwidth of a baseband signal is the same as the RF bandwidth. Therefore, it is necessary for the sampling frequency of the baseband signal to be increased from several hundred MHz to several GHz, which leads to an increase in the amount of calculation. Also, commonly, noise proportional to the bandwidth of the baseband signal is mixed into the baseband signal, but in the pulse radar system, to the extent that the bandwidth of the baseband signal is wide, deterioration of signal quality due to noise is also a problem.

Next, problems of the synthetic aperture radar system disclosed in above Patent Documents 5 to 7 will be described below. A problem with a synthetic aperture radar system is that mechanical movement of the device is required, which makes it difficult to shorten the scanning time. This leads to a problem that the number of targets that can be inspected per unit time is limited when inspecting an article or a person with the imaging device. Also, in particular, the imaging device disclosed in Patent Document 7 requires a mechanical mechanism for moving the receiver, and thus the size and weight of the device increase even more.

As described above, commonly, an imaging device using radio waves has the problem that the cost, size, and weight of the device will be extremely large. On the other hand, if an attempt is made to solve this problem, then the required resolution and signal quality cannot be obtained, and thus a problem of poor accuracy occurs. Therefore, a problem occurs that the applications and opportunities where the imaging device can be actually used are limited. Also, a problem occurs that the speed of inspecting the target is limited.

An example object of the invention is to provide an object detection apparatus, an object detection method, and a computer-readable recording medium that solve the above problems, and whereby, in imaging of an object using radio waves, while suppressing deterioration of image quality, it is possible to reduce the cost and size of the apparatus.

Means for Solving the Problems

In order to achieve the example object described above, an object detection apparatus according to an example aspect of the invention is an object detection apparatus for detecting an object with radio waves, the object detection apparatus including:

a transmission unit configured to emit a radio wave as a transmission signal toward the object;

a reception unit configured to receive, through a plurality of receiving antennas, radio waves reflected by the object as reception signals, and to generate, for each reception signal received by the respective plurality of receiving antennas, using the reception signals, an intermediate frequency signal; and an arithmetic unit configured to decide sampling times so as to suppress generation of a virtual image by a beam pattern obtained by synthesizing the respective intermediate frequency signals, and to generate intermediate frequency signals for object position detection by performing sampling on the intermediate frequency signals at the decided sampling times, and to detect the object using the generated intermediate frequency signals for position detection.

Also, in order to achieve the example object described above, an object detection method according to an example aspect of the invention is a method for detecting an object with radio waves, the object detection method including:

(a) a step of emitting a radio wave as a transmission signal toward the object;

(b) a step of receiving, through a plurality of receiving antennas, radio waves reflected by the object as reception signals, and generating, for each reception signal received by the respective plurality of receiving antennas, using the reception signals, an intermediate frequency signal;

(c) a step of deciding sampling times so as to suppress generation of a virtual image by a beam pattern obtained by synthesizing the respective intermediate frequency signals, and generating intermediate frequency signals for object position detection by performing sampling on the intermediate frequency signals at the decided sampling times; and (d) a step of detecting the object using the generated intermediate frequency signals for position detection.

Furthermore, in order to achieve the example object described above, a computer-readable recording medium according to an example aspect of the invention includes, in an object detection apparatus including a transmission unit configured to emit a radio wave as a transmission signal toward an object, a reception unit configured to receive, through a plurality of receiving antennas, radio waves reflected by the object as reception signals, and to generate, for each reception signal received by the respective plurality of receiving antennas, using the respective reception signals, an intermediate frequency signal, and a computer, a program recorded on the computer-readable recording medium, the program including instructions that cause the computer to carry out:

(a) a step of deciding sampling times so as to suppress generation of a virtual image by a beam pattern obtained by synthesizing the respective intermediate frequency signals, and generating intermediate frequency signals for object position detection by performing sampling on the intermediate frequency signals at the decided sampling times; and (b) a step of detecting the object using the generated intermediate frequency signals for position detection.

Advantageous Effects of the Invention

As described above, according to the invention, in imaging of an object using radio waves, while suppressing deterioration of image quality, it is possible to reduce the cost and size of the apparatus.

EXAMPLE EMBODIMENTS

Following is a description of example embodiments of a transmission device and a transmission method according to the invention, with reference to the accompanying drawings. In each of the drawings indicated below, the same or corresponding portions are designated by the same reference signs, and a description of such portions is not be repeated.

EXAMPLE EMBODIMENT

Below, an object detection apparatus, an object detection method, and a program according to Embodiment 1 of the invention will be described with reference to FIGS. 1 to 9. This Embodiment 1 is disclosed with respect to an example in which not only the position of an object that is a detection target, but also information regarding shape, such as the width of this object, can be detected using a small radar device.

[Apparatus Configuration]

Figure 1:
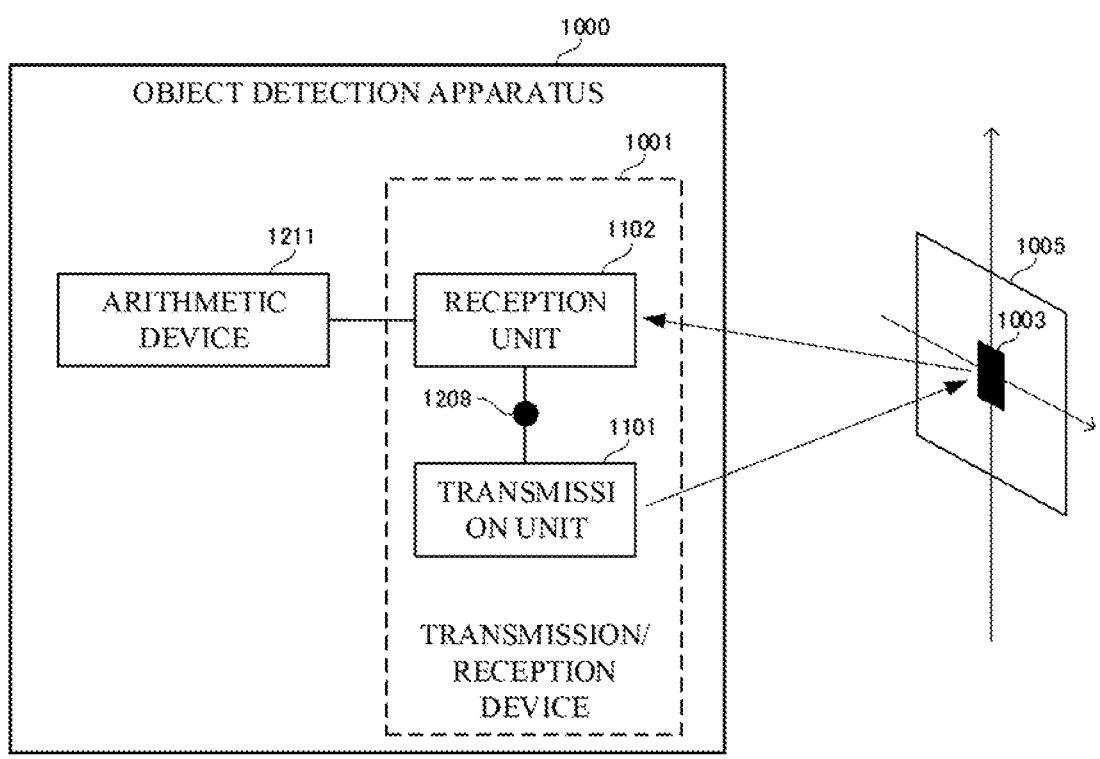
FIG. 1 shows a schematic configuration of an object detection apparatus according to Embodiment 1 of the invention.

First, the configuration of the object detection apparatus according to this Embodiment 1 will be described with reference to FIG. 1. FIG. 1 shows a schematic configuration of the object detection apparatus according to Embodiment 1 of the invention.

An object detection apparatus 1000 according to this Embodiment 1 shown in FIG. 1 is an apparatus for detecting an object using radio waves. As shown in FIG. 1, the object detection apparatus 1000 includes a transmission unit 1101, a reception unit 1102, and an arithmetic device 1211.

In addition, in the present embodiment, a transmission/reception device 1001 is configured with the transmission unit 1101 and the reception unit 1102, and the object detection apparatus 1000 is mainly configured with the transmission/reception device 1001 and the arithmetic device 1211. Further, the arithmetic device 1211 functions as an arithmetic unit in the object detection apparatus 1000.

The transmission unit 1101 emits a radio wave serving as a transmission signal toward an object that is present on a target arrangement plane 1005 and serves as a detection target (hereinafter referred to as a "target") 1003.

The reception unit 1102 receives radio waves reflected by the target 1003 as reception signals with a plurality of receiving antennas (see FIG. 2 described later). The reception unit 1102 further generates an intermediate frequency signal (hereinafter referred to as an "IF (Intermediate Frequency) signal") for each reception signal received by the respective receiving antennas, using the reception signals.

Specifically, as shown in FIG. 1, the transmission unit 1101 outputs a transmission signal toward the reception unit

1102 through the terminal 1208. The reception unit 1102 mixes a reception signal reflected by the target 1003 and the transmission signal output through the terminal 1208, and generates an IF signal. Also, the transmission unit 1101 outputs the generated IF signal to the arithmetic device 1211.

The arithmetic device (arithmetic unit) 1211 decides sampling times such that generation of a virtual image due to a beam pattern obtained by synthesizing respective IF signals is suppressed. Further, the arithmetic device 1211 generates an IF signal for detecting the position of the target 1003 (hereinafter referred to as a "position detection IF signal") by sampling an IF signal at decided sampling times. Then, the arithmetic unit 1211 detects the target 1003 using the position detection IF signal.

Thus, in this Embodiment 1, sampling data obtained by sampling the IF signal at appropriate sampling times can be used as an IF signal from the reception signal received by a virtual antenna. In other words, in this Embodiment 1, a virtual antenna that does not actually exist can be replaced with a receiving antenna in a common array antenna system, and thus it is possible to realize similarly high resolution as a case where a larger number of receiving antennas are provided than the actual number of receiving antennas. Therefore, according to this Embodiment 1, in imaging of an object using radio waves, while suppressing deterioration of image quality, it is possible to reduce the cost and size of the apparatus.

Also, in FIG. 1, only one transmission unit 1101 and one reception unit 1102 are shown, but a plurality of the transmission units 1101 and the reception units 1102 may actually be provided. When a plurality of the transmission units 1101 and the reception units 1102 are provided, each of the plurality of reception units 1102 corresponds to one of the transmission units 1101.

Figure 3:
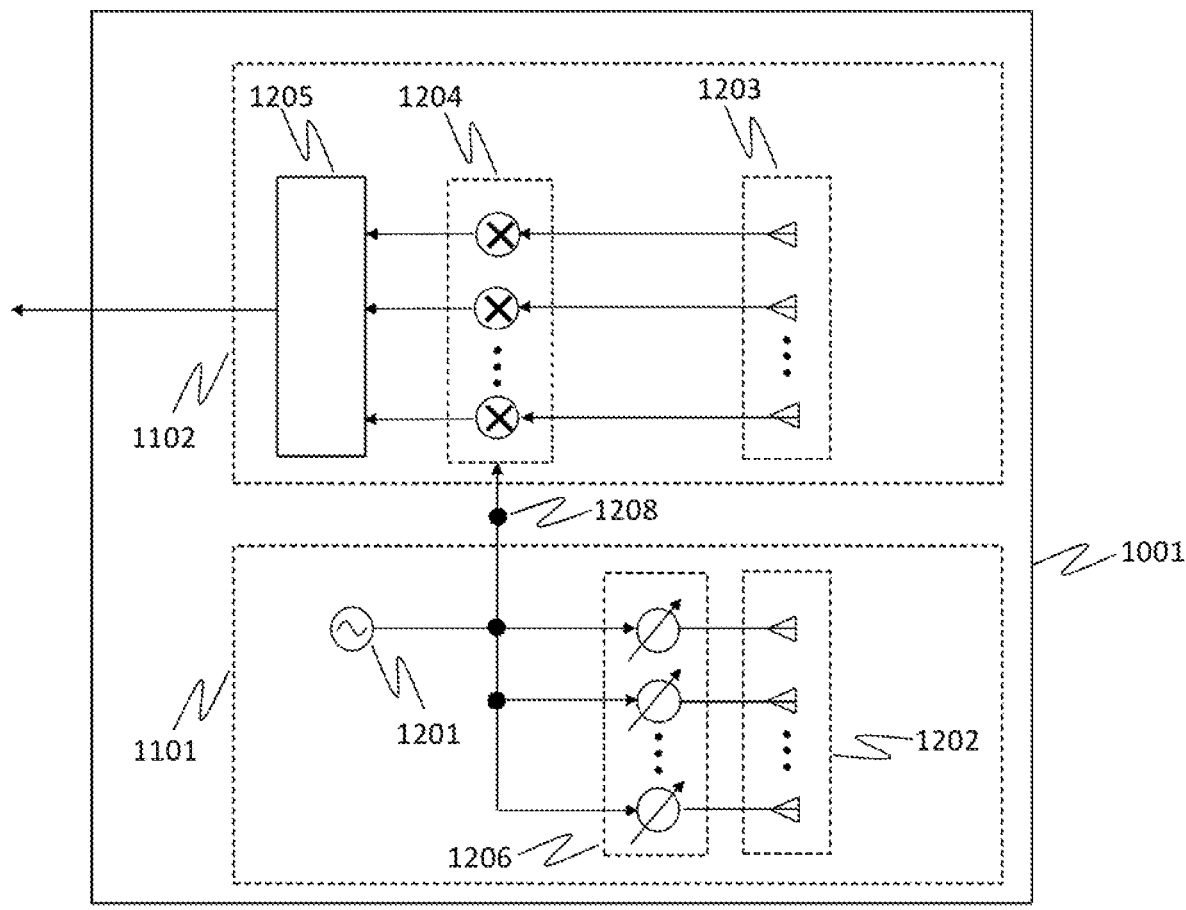
FIG. 3 specifically shows the configuration of another example of a transmission unit and a reception unit of the object detection apparatus according to Embodiment 1 of the invention.
Figure 4:
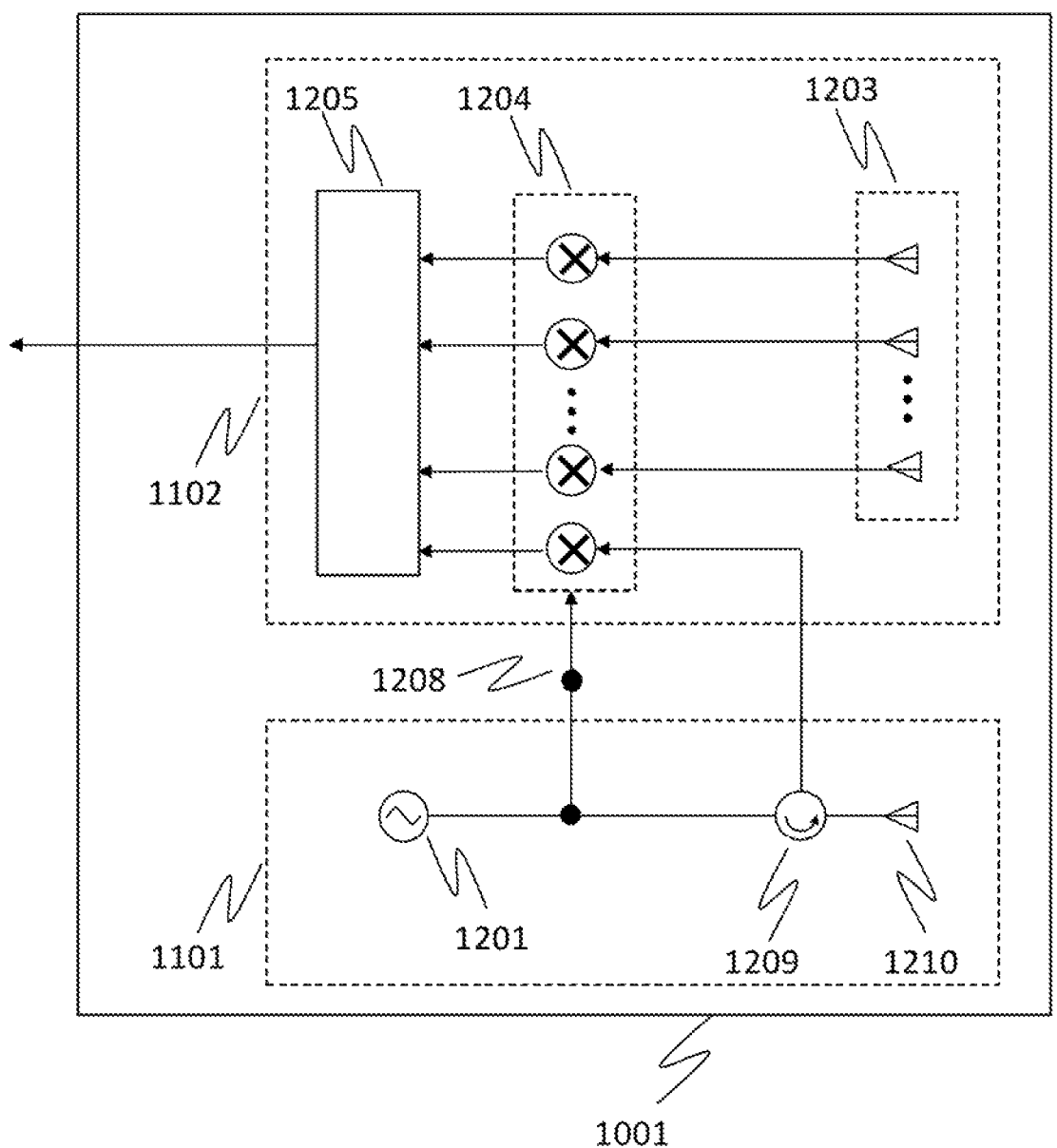
FIG. 4 specifically shows the configuration of another example of a transmission unit and a reception unit of the object detection apparatus according to Embodiment 1 of the invention.

Next, the configuration of the object detection apparatus 1000 according to this Embodiment 1 will be described more specifically with reference to FIGS. 2 to 4 in addition to FIG. 1. FIG. 2 specifically shows the configuration of a transmission unit and a reception unit of the object detection apparatus according to Embodiment 1 of the invention. FIG. 3 specifically shows the configuration of another example of a transmission unit and a reception unit of the object detection apparatus according to Embodiment 1 of the invention. FIG. 4 specifically shows the configuration of another example of a transmission unit and a reception unit of the object detection apparatus according to Embodiment 1 of the invention.

Figure 2:
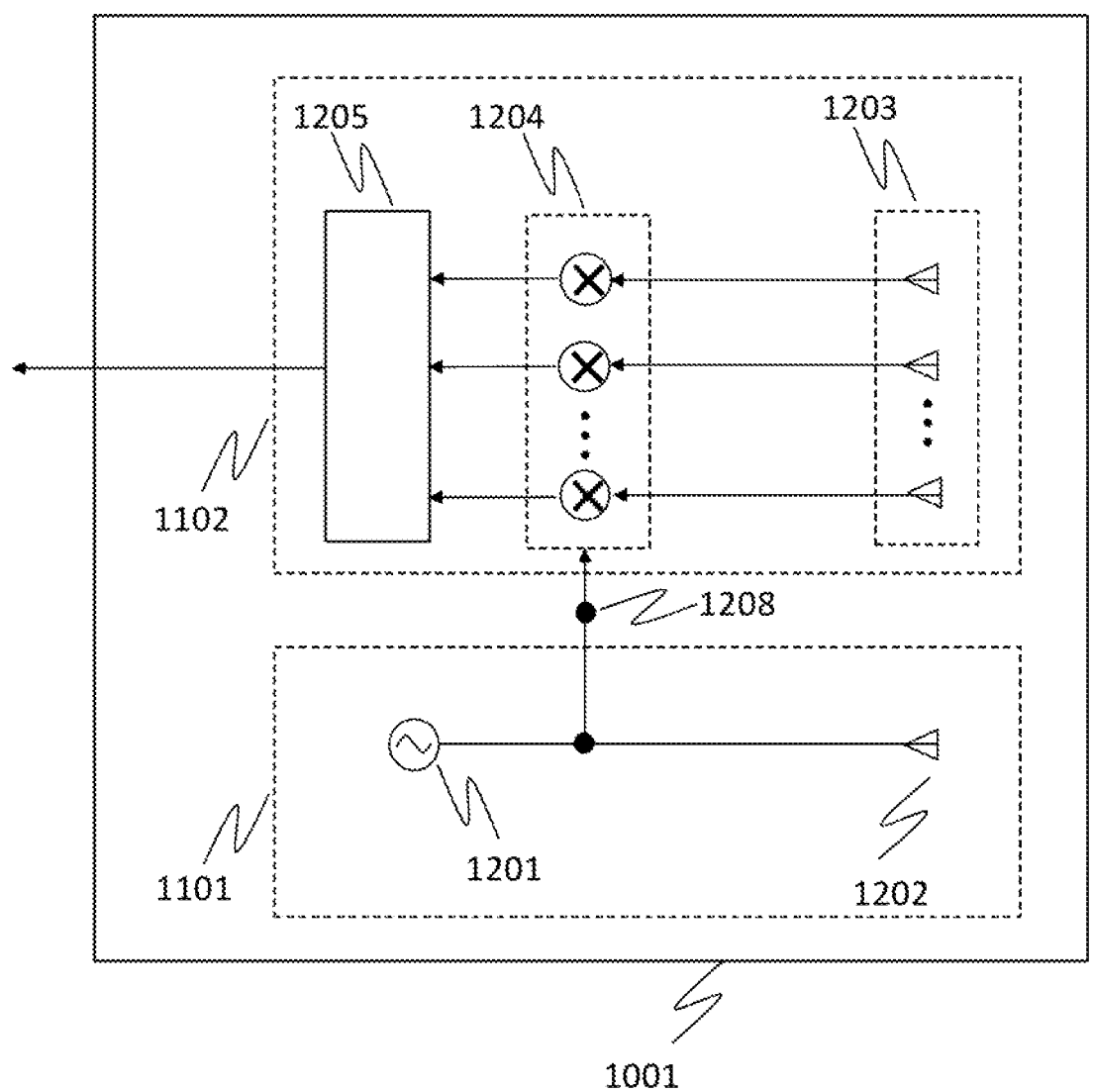
FIG. 2 specifically shows the configuration of a transmission unit and a reception unit of the object detection apparatus according to Embodiment 1 of the invention.

As shown in FIG. 2, in this Embodiment 1, in the transmission/reception apparatus 1001, transmission unit 1101 includes an oscillator 1201 and a transmission antenna 1202. The reception unit 1102 also includes a receiving antenna 1203, a mixer 1204, and an interface circuit 1205. Furthermore, as shown in FIG. 1, the transmission unit 1101 and the reception unit 1102 are connected through the terminal 1208.

In the transmission unit 1101, the oscillator 1201 generates an RF signal (radio wave). The RF signal generated by the oscillator 1201 is transmitted as a transmission signal from the transmission antenna 1202 and emitted to the target 1003. The radio wave reflected by the target 1003 is received by the receiving antenna 1203 in the reception unit 1102.

The mixer 1204 generates an IF signal by mixing the RF signal input from the oscillator 1201 through the terminal 1208 and the radio wave (reception signal) received by the receiving antenna 1203. The IF signal generated by the mixer 1204 is transmitted to the arithmetic device 1211 through the interface circuit 1205. The interface circuit 1205 has a function of converting an IF signal, which is an analog signal, into a digital signal that can be handled by the arithmetic device 1211, and outputs the obtained digital signal to the arithmetic device 1211.

Further, in the example shown in FIG. 2, one transmission unit 1101 is provided with one transmission antenna 1202, but the present embodiment is not limited to this mode. In the present embodiment, for example, as shown in FIG. 3, one transmission unit 1101 may be provided with a plurality of transmission antennas 1202.

Specifically, in the example of FIG. 3, the transmission unit 1101 includes one oscillator 1201 and a plurality of transmission antennas 1202. The transmission unit 1101 also includes a variable phase shifter 1206 provided for each transmission antenna 1202, and each transmission antenna 1202 is connected to the oscillator 1201 through a variable phase shifter 1206. Each variable phase shifter 1206 controls the phase of the transmission signal supplied from the oscillator 1201 to the respective transmission antennas 1202, and thus the directivity of the transmission antennas 1202 is controlled.

In this Embodiment 1, for example, as shown in FIG. 4, a transmission/receiving shared antenna 1210 may be provided instead of the transmission antenna 1202. Specifically, in the example of FIG. 4, the transmission unit 1101 is provided with a transmission/receiving shared antenna 1210 and a circulator 1209. The circulator 1209 outputs the transmission signal supplied from the oscillator 1201 to the transmission/receiving shared antenna 1210. The transmission/receiving shared antenna 1210 emits the transmission signal output from the circulator 1209 to the target 1003. A reflection signal from the target 1003 received by the transmission/receiving shared antenna 1210 is output to the mixer 1204 through the circulator 1209.

Further, in this Embodiment 1, the reception unit 1102 can include a reference receiving antenna and a measurement receiving antenna. In this case, the arithmetic device 1211 executes sampling on an intermediate frequency signal generated from a reception signal received by the measurement receiving antenna and an intermediate frequency signal generated from a reception signal received by the reference receiving antenna.

Then, the arithmetic device 1211, based on obtained sample values, normalizes the IF signal generated from the reception signal received by the measurement receiving antenna according to the IF signal generated from the reception signal received by the reference receiving antenna, and generates a position detection IF signal.

Also, the arithmetic device 1211 can execute processing to limit the position of the target 1003 (the distance to the object detection apparatus 1000) on the IF signal generated from the reception signal received by the measurement receiving antenna and the IF signal generated from the reception signal received by the reference receiving antenna. In this case, the arithmetic device 1211 executes sampling using an IF signal on which processing has been executed.

Further, in the present embodiment, the arithmetic device 1211 calculates a correlation matrix from position detection IF signals, and calculates an evaluation function that represents a position distribution of the target 1003 from the calculated correlation matrix. Also, the arithmetic device 1211 detects the position and shape of the target 1003 using the calculated evaluation function.

Here, a transmission signal emitted to an object in the present embodiment will be described with reference to FIG.

Figure 5:
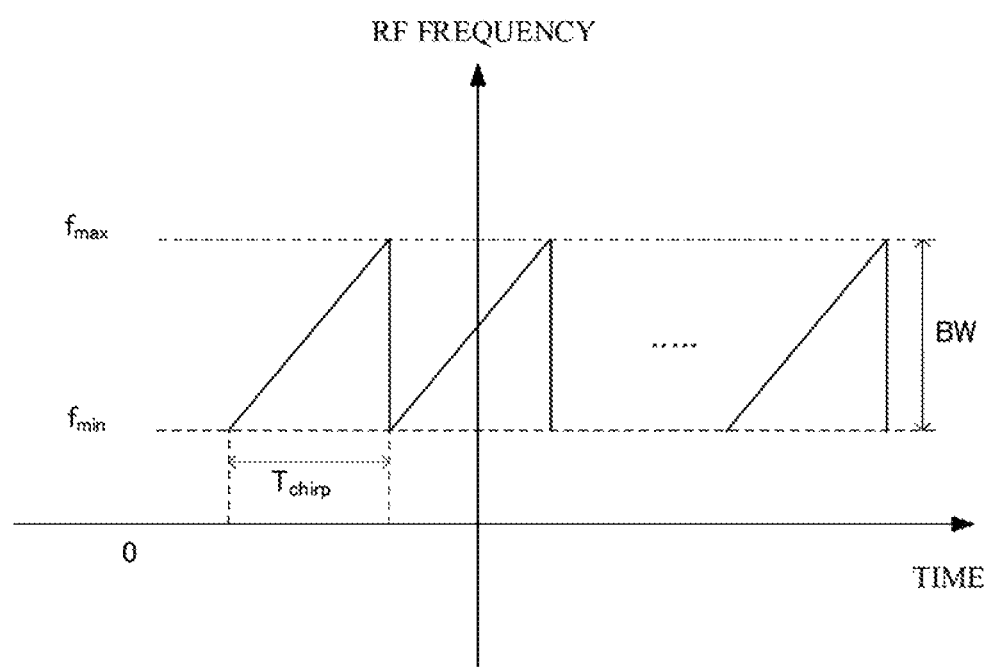
FIG. 5 shows an example of a transmission signal emitted by the object detection apparatus according to Embodiment 1 of the invention.

5. FIG. 5 shows an example of a transmission signal emitted by the object detection apparatus according to Embodiment 1 of the invention.

In this Embodiment 1, the RF signal generated by the oscillator 1201, as shown in FIG. 5, preferably is an FMCW signal in which the RF frequency changes over time from $f_{min}$ to $f_{min}+BW$ (=$f_{max}$) in a period $T_{chirp}$. Note that $f_{min}$ is the minimum value of the RF frequency, and BW is the bandwidth of the RF signal. Also, the change over time of the RF frequency may be continuous or discrete.

Figure 6:
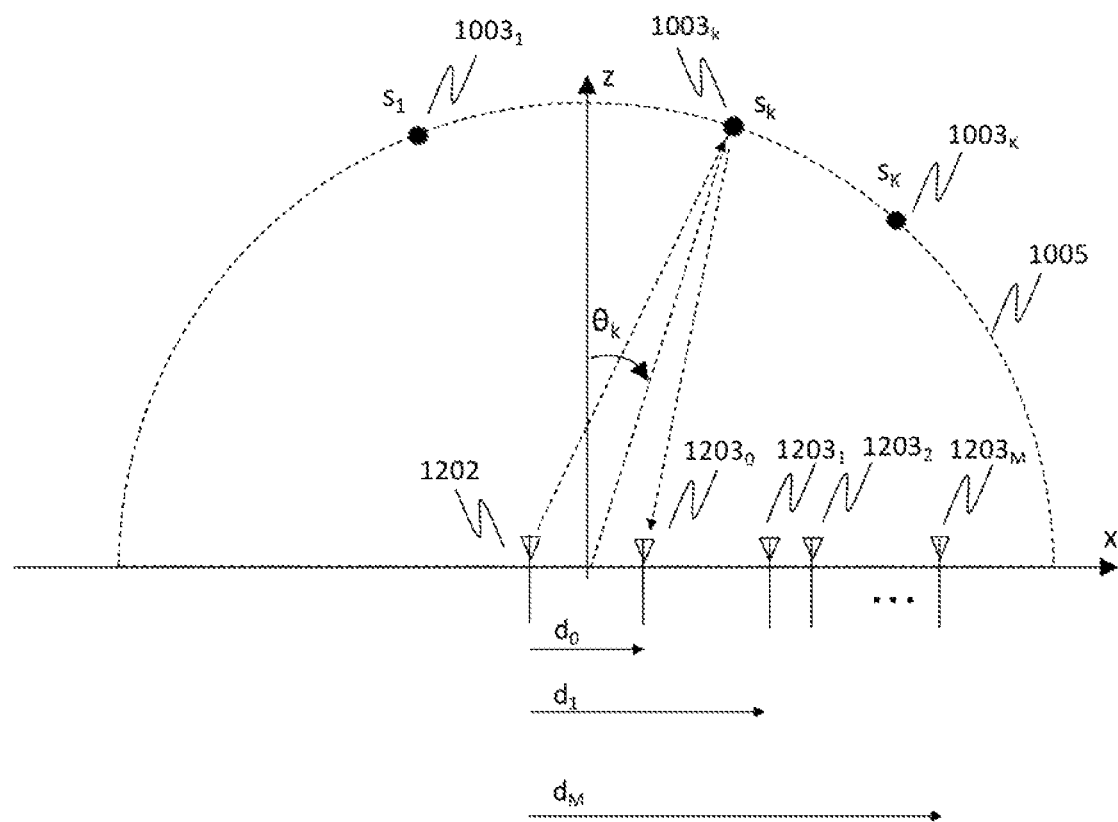
FIG. 6 shows an example of a positional relationship between an object that is a detection target, and a transmission antenna and a receiving antenna for performing detection, in Embodiment 1 of the invention.
Figure 7:
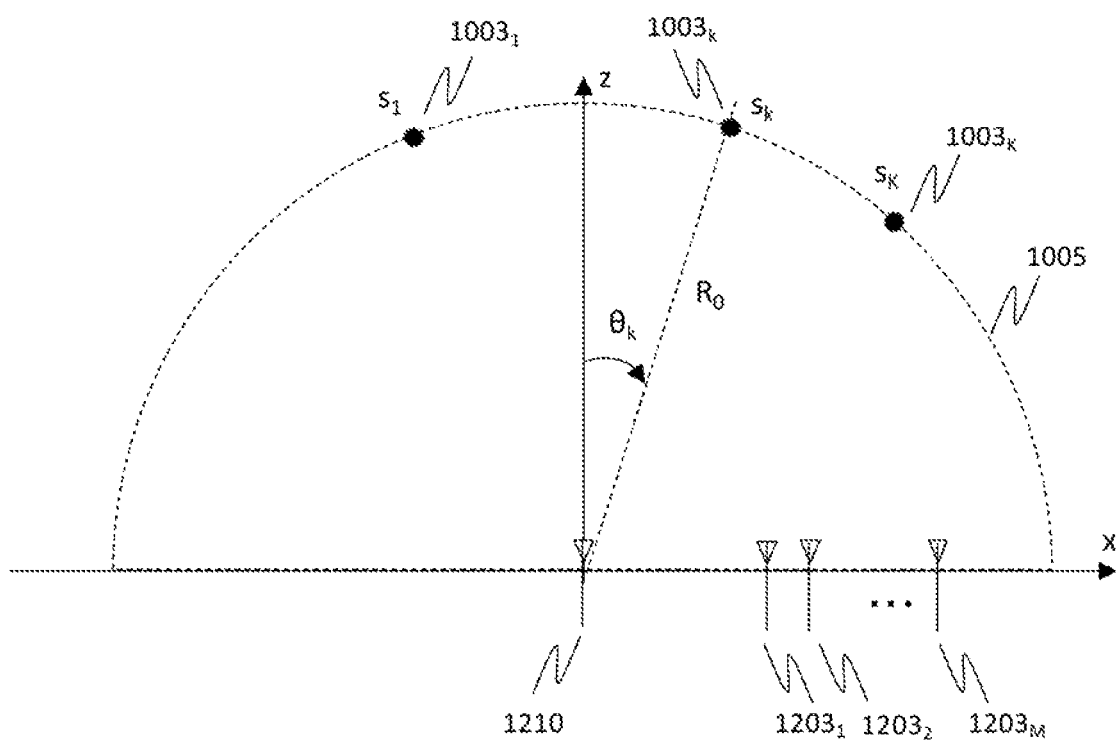
FIG. 7 shows another example of a positional relationship between an object that is a detection target, and a transmission antenna and a receiving antenna for performing detection, in Embodiment 1 of the invention.

Also, here, the positional relationship between the target 1003, and the transmission antenna 1202 and the receiving antenna 1203, will be described with reference to FIGS. 6 and 7. FIG. 6 shows an example of a positional relationship between an object that is a detection target, and a transmission antenna and a receiving antenna for performing detection, in Embodiment 1 of the invention. FIG. 7 shows another example of a positional relationship between an object that is a detection target, and a transmission antenna and a receiving antenna for performing detection, in Embodiment 1 of the invention.

In the example of FIG. 6, the receiving antenna 1203 is configured with a reference receiving antenna $1203_0$ and a measurement receiving antenna $1203_m$ (where m=1, 2, . . . , M).

As shown in FIG. 6, a circumstance is considered in which a number K of targets $1003_k$ (where k=1, 2, . . . , K) are present on an elliptical target arrangement plane 1005 with the transmission antenna 1202 and the reference receiving antenna $1203_0$ as focal points. Also, a path length from the transmission antenna 1202 through the target $1003_k$ to the reference receiving antenna $1203_0$ is represented as $2R_0$. Also, an interval between the transmission antenna 1202 and the receiving antenna $1203_m$ (where m=0, 1, 2, . . . , M) is represented as $d_m$. It is assumed that a reflection wave from the target $1003_k$ (where k=1, 2, . . . , K) is received with amplitude $s_k$ at each receiving antenna $1203_m$ (where m=1, 2, . . . , M).

Also, in the example shown in FIG. 6, the transmission antenna 1202 and the reference receiving antenna $1203_0$ are installed separately. On the other hand, in the example shown in FIG. 7, the transmission/receiving shared antenna 1210 is used instead of the transmission antenna 1202 and the reference receiving antenna $1203_0$. The transmission/receiving shared antenna 1210 has the functions of both the transmission antenna 1202 and the reference receiving antenna $1203_0$, and fulfills the role of both. Further, in the example shown in FIG. 7, it is assumed that the target $1003_k$ (where k=1, 2, . . . , K) is arranged on a circle with a radius $R_0$ centered on the transmission/receiving shared antenna 1210.

[Apparatus Operation]

Figure 8:
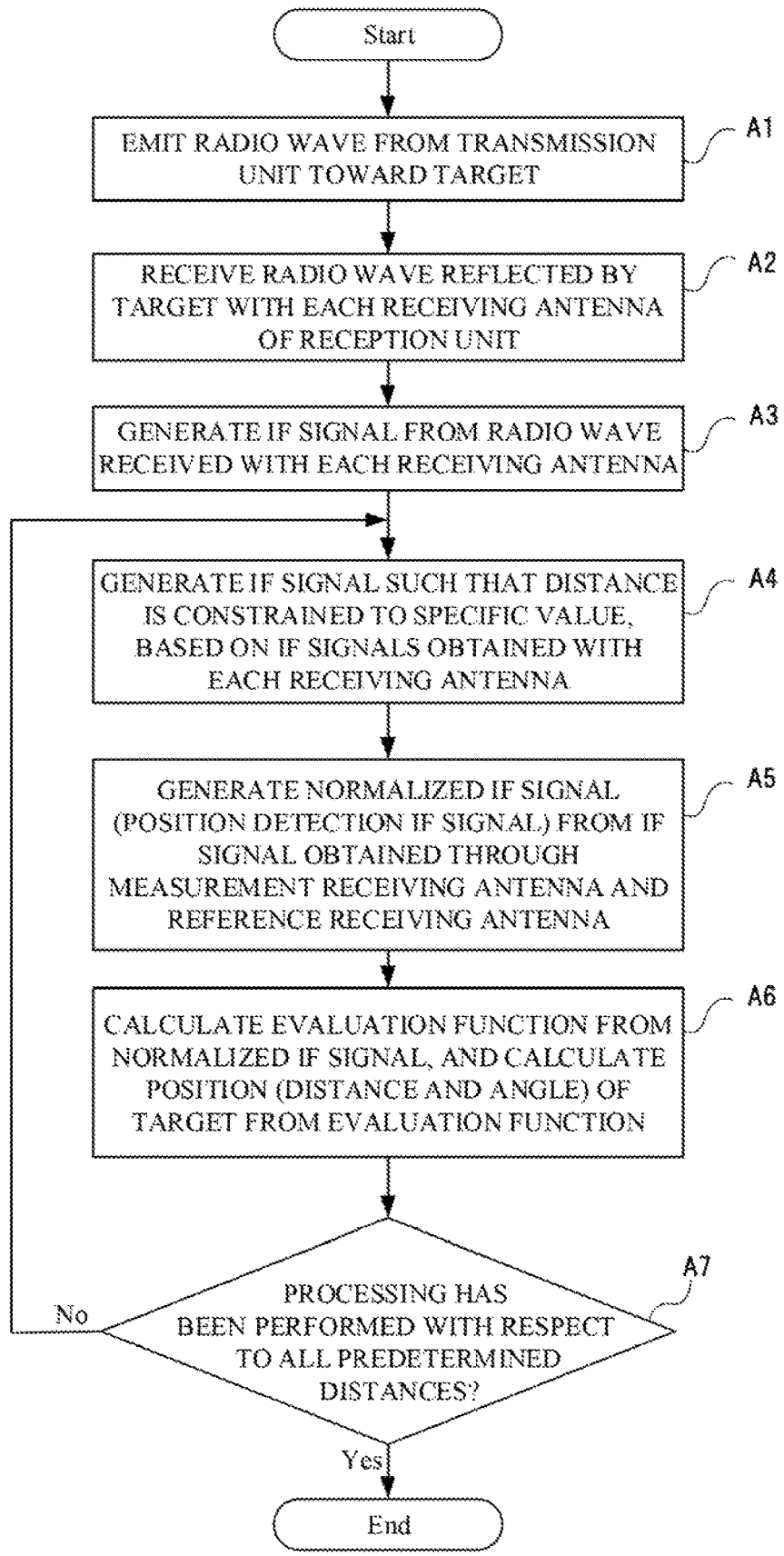
FIG. 8 is a flowchart showing operation of the object detection apparatus according to Embodiment 1 of the invention.

Next, operation of the object detection apparatus 1000 according to this Embodiment 1 will be described with reference to FIGS. 8 and 9. FIG. 8 is a flowchart showing operation of the object detection apparatus according to Embodiment 1 of the invention. In the following description, FIGS. 1 to 7 will be referred to as appropriate. Further, in this Embodiment 1, the object detection method is implemented by operating the object detection apparatus 1000. Therefore, the description of the object detection method in this Embodiment 1 is replaced with the following description of the operation of the object detection apparatus 1000.

As shown in FIG. 8, first, in the transmission/reception device 1001, the transmission unit 1101 emits a radio wave serving as a transmission signal toward the target 1003 (step A1). Also, the transmission unit 1101, at the same time as emission of the radio wave that serves as the transmission signal, outputs the transmission signal to the reception unit 1102 through the terminal 1208.

Next, in the transmission/reception device 1001, the receiving antenna 1203 of the reception unit 1102 receives the radio wave reflected from the target 1003 as a reception signal (step A2).

Next, the reception unit 1102 mixes the respective transmission signals generated by the transmission unit 1101 with the respective reception signals received by each receiving antenna 1203, and generates an IF signal (step A3).

Next, the arithmetic device 1211, based on the respective IF signals obtained from the reception signal of each receiving antenna 1203 in step A3, generates an IF signal such that the distance from the target 1003 to the object detection apparatus 1000 is constrained to a specific value (step A4). Specifically, the arithmetic device 1211 executes processing to limit the detection range of the target 1003 on the IF signal generated from the reception signal received by the measurement receiving antenna and the IF signal generated from the reception signal received by the reference receiving antenna.

Next, the arithmetic device 1211 generates a position detection IF signal using the IF signal of the measurement receiving antenna $1203_m$ (where m=1, 2, . . . , M) and the IF signal of the reference receiving antenna $1203_0$ (Step A5).

Specifically, the arithmetic device 1211 decides sampling times such that generation of a virtual image due to a beam pattern obtained by synthesizing respective IF signals is suppressed. Then, the arithmetic device 1211 performs interpolation processing such that the value of the decided sampling times is obtained, and calculates the value of the IF signal of the measurement receiving antenna $1203_m$ (where m=1, 2, . . . , M) and the value of the IF signal of the reference receiving antenna $1203_0$. Afterward, the arithmetic device 1211 uses the calculated value to normalize the measurement receiving antenna IF signal according to the reference receiving antenna IF signal, and generates a normalized IF signal. This normalized IF signal that is generated is used as the position detection IF signal.

Next, the arithmetic device 1211 calculates an evaluation function from the normalized IF signal, and further calculates the position (distance and angle) of the target 1003 from the evaluation function (step A6).

Next, the arithmetic device 1211 determines whether or not processing has been performed with respect to all predetermined distances (step A7). If the result of the determination in step A7 is Yes, then the arithmetic device 1211 ends operation. On the other hand, if the result of the determination in step A7 is No, then the arithmetic device 1211 executes step A4 again.

Next, steps A3 to A7 among steps A1 to A7 shown in FIG. 8 will be described in more detail.

[Step A3]

First, the details of step A3 will be described, in which the respective transmission signals generated by the transmission unit 1101 are mixed with the reception signals received by each receiving antenna 1203, and an IF signal is generated.

In the arrangement shown in FIG. 6 or 7, a reference IF signal ($IF_0(t)$) calculated from the reception signal of the reference receiving antenna $1203_0$ or the transmission/receiving shared antenna 1210 is given by the following Formula (3).

[Formula 3]

$$IF_0(t) = S_{tot}\exp[-j2\pi(f_{min} + \alpha t)2R_0/c], \quad S_{tot} \equiv \sum_{k=1}^{K} s_k, \quad (3)$$

In the above Formula (3), a represents the chirp rate of the chirp signal shown in FIG. 5, and is given by $\alpha = BW/T_{chirp}$. The speed of light is represented by c, and time is represented by t.

Further, the measurement IF signal ($IF_m(t)$) calculated from the reception signal of the measurement receiving antenna $1203_m$ (where m=1, 2, . . . , M) is given by the following Formula (4). In the following Formula (4), $\Delta d_m = d_m - d_0$.

[Formula 4]

$$IF_m(t) = \sum_{k=1}^{K} s_k \exp[-j2\pi(f_{min} + \alpha t)(2R_0 - \Delta d_m \sin\theta_k)/c], \quad (4)$$

[Step A4]

Next, the details of step A4 will be described, in which the arithmetic device 1211, based on the IF signals obtained from the reception signal of each receiving antenna 1203 in step A3, generates an IF signal such that the distance from the target 1003 to the object detection apparatus 1000 is constrained to a specific value.

In the example shown in FIG. 6 or 7, the target 1003 is arranged on the elliptical (or circular) target arrangement plane 1005 in which the path length from the transmission antenna 1202 through the target 1003 to the reference receiving antenna $1203_0$ is $2R_0$. In an actual circumstance, a target may be present at a position other than on the target arrangement plane 1005 designated by the distance $R_0$. Therefore, in step A4, the arithmetic device 1211 extracts only the signal from the target 1003 present at a position on the target arrangement plane 1005 designated by the distance $R_0$.

For example, it is assumed that the target 1003 is present at the position of the distance $R_0$ on the target arrangement plane 1005. In this case, the reference IF signal ($IF_0(t)$) of Formula (3) generated by the target 1003 has a frequency of $2\alpha R_0/c$. Therefore, if Fourier transformation is performed on the time waveform of the reception IF signal obtained by the reference receiving antenna $1203_0$ or the transmission/receiving shared antenna 1210, and only the frequency signal component of $2\alpha R_0/c$ is extracted, an IF signal is obtained such that the position of the target 1003 is constrained to the desired position (distance range).

The measurement IF signal ($IF_m(t)$) in above Formula (4) has a frequency from "$2\alpha(R_0 - \Delta d_m)/c$" to "$2\alpha(R_0 + \Delta d_m)/c$". Therefore, if Fourier transformation is performed on the time waveform of the measurement IF signal obtained by the measurement receiving antenna $1203_m$ (where m=1, 2, . . . , M), and only the frequency signal component from $2\alpha(R_0 - \Delta d_m)/c$ to $2\alpha(R_0 + \Delta d_m)/c$ is extracted, an IF signal is obtained such that the distance value is constrained to $R_0$.

[Step A5]

Next, the details of step A5 will be described, in which the measurement receiving antenna IF signal is normalized according to the reference receiving antenna IF signal, and a normalized IF signal is generated.

Figure 9:
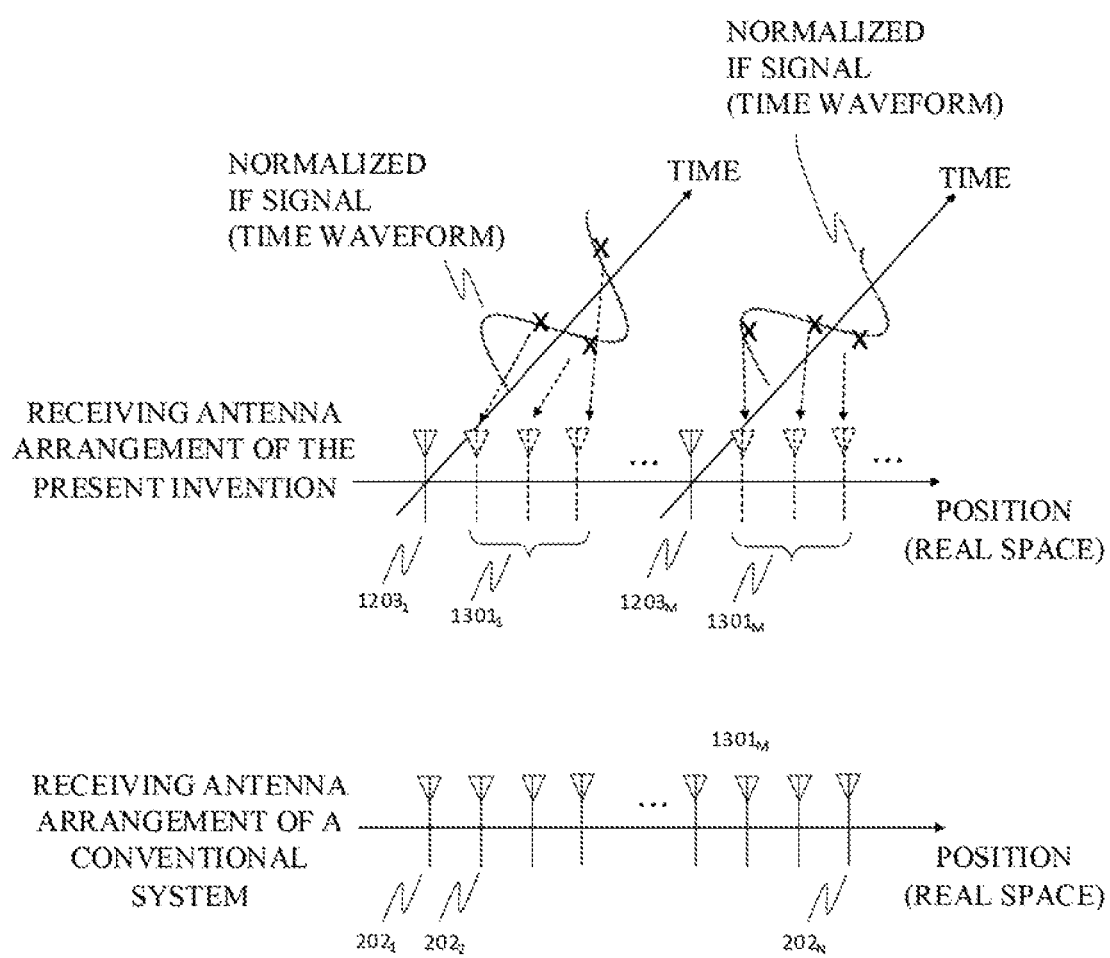
FIG. 9 shows an arrangement of distance measurement receiving antennas used in Embodiment 1 of the invention and how to obtain a desired time sampling point.

FIG. 9 shows the arrangement of the measurement receiving antenna $1203_m$ (where m=1, 2, . . . , M) used in this Embodiment 1, and how to obtain a desired time sampling point. The lower part of FIG. 9 also shows the arrangement of a receiving antenna 202 in a conventional system.

As stated in the section describing background art, in an antenna array of a conventional system, in order to prevent the generation of a virtual image, the interval between receiving antennas $202_n$ (where n=1, 2, . . . , N) needs to be set to half the wavelength k of the reception wave. Further, in order to realize high resolution, it is necessary to increase the array aperture size (the length from the receiving antenna $202_1$ to the receiving antenna $202_N$), and as a result, a large number of receiving antennas 202 are required.

In this Embodiment 1, sampling data of the time waveform of the normalized IF signal $r_m(t)$ obtained by dividing the measurement IF signal ($IF_m(t)$) by the reference IF signal ($IF_0(t)$) is used as a virtual antenna array $1301_m$ (where m=1, 2, . . . , M). Then, by using the virtual antenna array $1301_m$ (where m=1, 2, . . . , M) as a substitute for the receiving antennas $202_n$ (where n=1, 2, . . . , N) of the conventional system, high resolution is realized while keeping a small number M of the actual receiving antennas $1203_m$ (where m=1, 2, . . . , M).

In this Embodiment 1, it is necessary to properly set the sampling times of the time waveform and the positions of the actual receiving antennas $1203_m$ (where m=1, 2, . . . , M) in order to prevent the generation of a virtual image. Below, an example of setting the sampling times of the time waveform and the positions of the actual receiving antennas $1203_m$ (where m=1, 2, . . . M) so as to prevent the generation of a virtual image is disclosed.

In step A5, by dividing the measurement IF signal ($IF_m(t)$) by the reference IF signal ($IF_0(t)$), the normalized IF signal $r_m(t)$ given by Formula (5) is generated.

[Formula 5]

$$r_m(t) = IF_m(t)/IF_0(t) = \sum_{k=1}^{K} s'_k \exp[j2\pi(f_{min} + \alpha t)\Delta d_m \sin\theta_k/c], \quad (5)$$

$$s'_k = s_k/S_{tot},$$

The normalized IF signal $r_m(t)$ obtained by the receiving antenna $1203_m$ (where m=1, 2, . . . , M) is obtained at sampling times $t_{(m,1)}, t_{(m,2)}, \ldots, t_{(m,p(m))}$. p(m) is the sampling score of the normalized IF signal obtained by the receiving antenna $1203_m$. N represents the sum p(1)+p(2)+ . . . +p(M) of the sampling points of all antennas.

A normalized IF signal vector r is defined as follows.

$$r = [r_{1,1}, \ldots, r_{1,p(1)}, \ldots, r_{M,1}, \ldots, r_{M,p(M)}]^T,$$

Here, $r_m(t_{(m,n)}) = r_{m,n}$. An Nth-order vector is represented by r. The n-th component $r_n$ of the normalized IF signal vector r is expressed by the following Formulas (6) and (7).

[Formula 6]

$$r_n = \sum_{k=1}^{K} s'_k \exp[j\varphi_n(\theta_k)], \quad (6)$$

[Formula 7]

$$\phi_n(\theta) \equiv 2\pi(f_{min} + \alpha t_n)\Delta d_m \sin\theta/c, \quad (7)$$

The time to in above Formula (7) is the n-th sampling time. The antenna position $\Delta d_m$ changes depending on the value of n.

Next is a description of conditions for generation of a virtual image. When the target 1003 is present in the direction of an angle $G_0$ and the conditions of following Formula (8) are satisfied, a virtual image of the target is generated in the direction of an angle $G_2$ where the target 1003 does not originally exist.

[Formula 8]

$$|\Delta\varphi_n(\theta_n)-\Delta\varphi_n(\theta_0)|=2\pi, \Delta\varphi_n(\theta)\equiv\varphi_{n+1}(\theta)-\varphi_n(\theta), \quad (8)$$

Next, in order to exclude the virtual image, the conditions of following Formula (9) are set.

[Formula 9]

$$|\Delta\varphi_n(\theta_a)-\Delta\varphi_n(\theta_0)|=2\pi\alpha\Delta t_m\Delta d_m|\sin\theta_a-\sin\theta_0|/c\leq 2\pi, \quad (9)$$

In above Formula (9), $\Delta t_m$ represents the sampling cycle of the normalized IF signal $r_m(t)$ obtained by the receiving antenna 1203$_m$ (where m=1, 2, ..., M). The condition of the sampling period $\Delta t_m$ where above Formula (9) is satisfied even if the angles $\theta_0$ and $\theta_a$ take arbitrary values in the range of $-\pi$ to $+\pi$ L is given by the following Formula (10).

[Formula 10]

$$\Delta t_m \leq \frac{c}{2\alpha\Delta d_m}, \quad (10)$$

As shown in above Formula (10), in this Embodiment 1, it is desirable to set the sampling period $\Delta t_m$ such that if an upper limit is determined according to the position $\Delta d_m$ of the receiving antenna 1203$_m$ (where m=1, 2, ..., M), then the sampling period $\Delta t_m$ will fall within this upper limit.

Also, regarding the receiving antennas 1203$_m$ and 1203$_{m+1}$ adjacent to each other, the conditions of following Formula (11) are set such that the range of phase $\varphi_n(\theta)$ of above Formula (7) is continuous.

[Formula 11]

$$f_{max}\Delta d_m \geq f_{min}\Delta d_{m+1}, (m=1,2,\ldots,M-1) \quad (11)$$

In a desirable mode of this Embodiment 1, the antenna position $\Delta d_m$ (where m=1, 2, ..., M-1) is determined such that the conditions of Formula (11) are satisfied.

When the interval between the receiving antennas 1203$_m$ and 1203$_{m+1}$ adjacent to each other is represented as $\Delta d'_m$ (=$\Delta d_{m+1}-\Delta d_m$), above Formula (11) is equivalent to following Formula (12).

[Formula 12]

$$\Delta d'_m \leq \frac{f_{max}-f_{min}}{f_{min}}\Delta d_m, \quad (12)$$

That is, in a preferable mode of this Embodiment 1, the interval between the receiving antennas 1203$_m$ and 1203$_{m+1}$ adjacent to each other is set to be no more than an upper limit value determined by the minimum RF frequency $f_{min}$ and the maximum RF frequency $f_{max}$.

In step A5, the arithmetic device 1211 first performs interpolation processing on each of the measurement IF signal ($IF_m(t)$) and the reference IF signal ($IF_0(t)$), and calculates a value for sampling times of the sampling cycle $\Delta t_m$ that satisfies above Formula (10). Next, the arithmetic device 1211 aligns the sampling times of the measurement IF signal ($IF_m(t)$) and the reference IF signal ($IF_0(t)$) by interpolation processing, and then divides the measurement IF signal ($IF_m(t)$) by the reference IF signal ($IF_0(t)$) as indicated in above Formula (5) to calculate the normalized IF signal $r_m(t)$ (where m=1, 2, ..., M).

[Step A6]

Next, the details of step A6 will be described, in which an evaluation function is calculated from a normalized IF signal.

In step A6, the arithmetic device 1211 selects a plurality of ranges of the normalized IF signal, calculates a correlation matrix from the respective plurality of normalized IF signals for which the selected plurality of ranges are prescribed, and then, from an average of the correlation matrix, calculates an evaluation function that represents a position distribution of the target 1003. This point will be described below.

First, in step A6, the arithmetic device 1211 configures a sub-array vector from the normalized IF signal vector $r=[r_1, r_2, \ldots, r_n, \ldots, r_N]$.

Specifically, a v-th sub-array is configured with the reception signal of the v-th to v+W 1-th sub-array, that is, $r_v=[r_v, r_{v+1}, \ldots, r_{v-W+1}]^T$. W corresponds to the number of sampling points included in each sub-array. Therefore, the arithmetic device 1211 calculates a correlation matrix $R_{col(v)}$ calculated from the v-th sub-array as shown in following Formula (13). The subscript H in Formula (13) below represents a complex conjugate transposition of the vector.

[Formula 13]

$$R_{col(v)}=r_v\cdot r_v^H, \quad (13)$$

$R_{all}$ represents the average of the correlation matrix $R_{col(v)}$ (where v=1, 2, ..., V) of all sub-arrays. The number V of sub-arrays is at least the number K of targets.

In the above method, by utilizing the property that the correlation weakens between the reception signals of different sub-arrays, problems caused by the correlation between reflections can be avoided. Further, in step A6, the arithmetic device 1211 uses a direction vector $a(\theta)$ given by the following Formula (14) and the correlation matrix $R_{all}$ calculated from the normalized IF signal to calculate any of the evaluation functions given by Formulas (15) to (17).

[Formula 14]

$$a(\theta) = [\exp(j\phi_1(\theta)), \exp(j\phi_2(\theta)), \cdots, \exp(j\phi_W(\theta))]^T, \quad (14)$$

[Formula 15]

$$P_{BF}(\theta) = \frac{a^H(\theta)R_{all}a(\theta)}{a^H(\theta)a(\theta)}, \quad (15)$$

(Evaluation Function By Beam Forming Method)

[Formula 16]

$$P_{CF}(\theta) = \frac{1}{a^H(\theta)R_{all}^{-1}a(\theta)}, \quad \text{(Evaluation Function By Capon Method)} \quad (16)$$

[Formula 17]

$$P_{MU}(\theta) = \frac{a^H(\theta)a(\theta)}{a^H(\theta)E_N E_N^H(\theta)}, \quad E_N = [e_{K+1}, \cdots, e_W], \quad (17)$$

(Evaluation Function By MUSIC Method)

Here, the vector $e_k$ (where k=K+1, ..., W) is a vector whose eigenvalue is equal to noise power among the eigenvectors of the correlation matrix $R_{all}$. The phase $\varphi(\theta)$ in Formula (14) is given by the above Formula (7).

The evaluation functions given by Formulas (15) to (17) produce a peak at the angle Ok where the target $1003_k$ (where k=1, 2, ..., K) is present. Therefore, the arithmetic device 1211 detects the position of the target $1003_k$ from the angle $\theta_k$ at which the peak of the evaluation function of Formulas (15) to (17) is obtained. Furthermore, the arithmetic device 1211 can estimate the distribution of the reflection intensity $s_k$ for the target $1003_k$ (where k=1, 2, ..., K) from the value of the evaluation function.

By the processing up to step A6 above, the distance $R_0$ and the angle $\theta_k$ are determined as an index expressing the position of the target $1003_k$ (where k=1, 2, ..., K).

[Step A7]

Next is a description of step A7. In steps A1 to A6, a presence angle $\theta_k$ of the target $1003_k$ is calculated after limiting the distance to the specific value $R_0$. Therefore, in step A7, the arithmetic device 1211 determines whether or not processing has been performed with respect to all of the predetermined distances.

If the result of the determination is that processing has not been performed with respect to all distances, the arithmetic device 1211 returns to step A4, changes the limited distance to another value, and then calculates the presence angle $\theta_k$ of the target $1003_k$. By repeating steps A4 to A7 in this way, the arithmetic device 1211 calculates the presence angle $\theta_k$ of the target $1003_k$ with respect to all of the predetermined distances.

On the other hand, if the result of the determination is that processing has been performed with respect to all distances, then the arithmetic device 1211 completes the processing from step A4 to step A6. Further, when scanning of the distribution of the target $1003_k$ has been completed with all of the predetermined distances and angles, the object detection apparatus 1000 ends this operation.

[Program]

The program according to this Embodiment 1 may be a program that causes a computer to execute steps A1 to A7 shown in FIG. 7. By installing this program in a computer provided in an object detection apparatus, and executing the program, a processor of the computer functions as the arithmetic device 1211. As a result, the object detection apparatus 1000 and the object detection method according to this Embodiment 1 can be realized.

[Apparatus Performance]

Next, the performance of the object detection apparatus 1000 according to the present embodiment, specifically, the resolution of the reflection intensity $s_k$ of the target $1003_k$, will be described.

The resolution of the reflection intensity $s_k$ obtained from the evaluation functions of above Formulas (15) to (17) is determined by the beam width formed by the antenna array with the receiving antenna arrangement shown in FIG. 9 in this Embodiment 1. For example, in the case of a beam steering-type system corresponding to Formulas (15) and (16), the resolution of the reflection intensity $s_k$ is approximately the same as the beam width of the antenna array. Further, in the case of a null steering-type system corresponding to Formula (17), the resolution of the reflection intensity $s_k$ is approximately a fraction of the beam width of the antenna array.

In this Embodiment 1, the beam width formed by the antenna array with the receiving antenna arrangement shown in FIG. 9 is calculated.

Further, when the reception signal of the antenna array is given by the above Formula (6), the antenna array directivity (array factor $AF(\theta)$) when the beam is directed in the direction of the angle $\theta_0$ is given by the following Formula (18).

[Formula 18]

$$|AF(\theta)| = \left|\sum_{n=1}^{N} \exp(j(\varphi_n(\theta) - \varphi_n(\theta_n)))\right| = \frac{\sin(Nu/2)}{\sin(u/2)}, \quad (18)$$

Here, $u=2\pi\Delta q$ (sin $\theta$−sin $\theta_0$). Note that $\Delta q=\alpha\Delta t_m \Delta d_m/c$ (where m=1, 2, ..., M). The sampling cycle $\Delta t_m$ corresponding to each receiving antenna is set according to the antenna position $\Delta d_m$, such that $\Delta q$ is constant regardless of the antenna number m.

The array factor $|AF(\theta)|$ given by the above Formula (18) has its maximum value at the angle $\theta_0$, and its peak width, that is, the beam width $\Delta\theta$, is given by approximately $\Delta\theta$ to $1/N\Delta q$(rad).

That is, the beam width $\Delta\theta$ depends on the sum N of the number of sampling points of all antennas and the parameter $\Delta q$ determined by the sampling period and the antenna position. Note that the condition of Formula (10), which is a condition that does not allow generation of a virtual image in the range of $-\pi$ to $+\pi$, is a value equivalent to $\Delta q \leq \frac{1}{2}$. $\Delta q=\frac{1}{2}$ results in the best beam width (angular resolution) under a condition that does not allow generation of a virtual image in the range of $-\pi$ to $+\pi$, and the beam width (angular resolution) in that case is $\Delta\theta$ to $2/N$(rad).

The beam width $\Delta\theta$, that is, the resolution does not directly depend on the number of antennas M. In other words, this Embodiment 1, in principle, can be configured with only two receiving antennas, namely one reference receiving antenna $1203_0$ and one measurement receiving antenna $1203_1$. Therefore the number of antennas can be significantly reduced in comparison to a conventional method using a large number of antennas. Furthermore, in this Embodiment 1, it is possible to improve the resolution without increasing the number of antennas, by only increasing the total sum N of the number of sampling points.

Also, the beam width $\Delta\theta$, that is, the resolution does not directly depend on the bandwidth BW of the RF signal. That is, the present embodiment, in principle, can operate even if the bandwidth of the RF signal is set to be arbitrarily narrow. Therefore, this Embodiment 1 can be realized even in a circumstance where the bandwidth of the RF signal that can be used in the radio wave method is constrained. Further, in the present embodiment, it is possible to arbitrarily improve the resolution without expanding the bandwidth BW of the RF signal, by only increasing the total sum N of the number of sampling points.

In this Embodiment 1, use of the FMCW signal is assumed. At this time, the frequency of the IF signal is given by $4BW \cdot R_0 / cT_{chip}$, and in a practical circumstance, the IF frequency is about several tens of kHz to several hundred kHz. In the present embodiment, the sampling rate and the amount of calculation are reduced in comparison to a pulse system in which the bandwidth of the baseband signal is a wide band from several hundred MHz to several GHz, and the problem of signal quality deterioration due to noise is avoided.

Effects in Embodiment 1

As described above, according to the object detection apparatus 1000 and the object detection method in the present embodiment, in comparison to a common array antenna system, the sampling data of the time waveform of the IF signal can be used as a virtual antenna. For this reason, according to this Embodiment 1, a virtual antenna can be substituted for a receiving antenna in a common array antenna system, and therefore high resolution can be realized while reducing the number of receiving antennas.

Also, consider a case compared with a conventional system in which a plurality of pulse signals with different RF frequencies are transmitted and virtual antennas are formed at positions corresponding to the RF frequencies. In a conventional system, it is necessary to set a wide range of RF frequencies in order to realize high resolution, but in this Embodiment 1, sampling data of the time waveform of the IF signal is used as a virtual antenna. Therefore, high resolution operation can be realized even in a circumstance where a wide bandwidth cannot be used for RF signals due to constraints of the radio wave method. Further, in comparison with a conventional system in which pulse signals are used, in this Embodiment 1, the IF signal has a narrow band, so the sampling rate and the amount of calculation are beneficially small, and the problem of signal quality deterioration due to noise can be avoided.

Also, in a conventional synthetic aperture radar system, it is necessary to mechanically move a receiver, and as a result, there is a problem that it takes a long time to detect and inspect an object. On the other hand, in this Embodiment 1, it is sufficient to electronically scan reception frequencies instead of the position of the receiver, so the time needed to detect and inspect an object can be shortened in comparison to a synthetic aperture radar system.

That is, in the object detection apparatus and the object detection method according to this Embodiment 1, the number of required antennas and the number of receivers associated with them can be reduced in comparison to a common array antenna system, so there is the effect that the cost, size, and weight of the apparatus are reduced. Further, in this Embodiment 1, there is the effect that high resolution operation can be realized even in a circumstance where a wide bandwidth cannot be used for RF signals due to constraints of the radio wave method.

Furthermore, in the object detection apparatus and the object detection method according to this Embodiment 1, there is the effect that the sampling rate of the IF signal and the amount of calculation are suppressed to a small amount, so the problem of signal quality deterioration due to noise can be avoided. Also, in the object detection apparatus and the object detection method according to this Embodiment 1, unlike a common synthetic aperture radar system, it is not necessary to mechanically move the apparatus, and as a result, there is the effect that it is possible to shorten the time needed to detect and inspect an object.

Embodiment 2

Next, an object detection apparatus, an object detection method, and a program according to Embodiment 2 of the invention will be described with reference to FIG. 10.

In Embodiment 1 described above, the two-dimensional position of the target 1003 is measured by two variables, namely the distance $R_0$ and the angle $\theta$. On the other hand, in this Embodiment 2, the three-dimensional position of the target 1003 is measured. This will be specifically described below.

[Apparatus Configuration]

The object detection apparatus according to this Embodiment 2 has the same configuration as the object detection apparatus shown in FIGS. 1 to 5 in Embodiment 1. Therefore, a description of the configuration of the object detection apparatus in this Embodiment 2 will be omitted.

However, in this Embodiment 2, part of the processing by the arithmetic device 1211 differs from Embodiment 1. Therefore, differences from Embodiment 1 will be described below.

First, the positional relationship between the target 1003, and the transmission/receiving shared antenna 1210 and the receiving antenna 1203, in this Embodiment 2 will be described with reference to FIG. 10. FIG. 10 shows an example of a positional relationship between an object that is a detection target, and a transmission antenna and a receiving antenna for performing detection, in Embodiment 2 of the invention.

Figure 10:
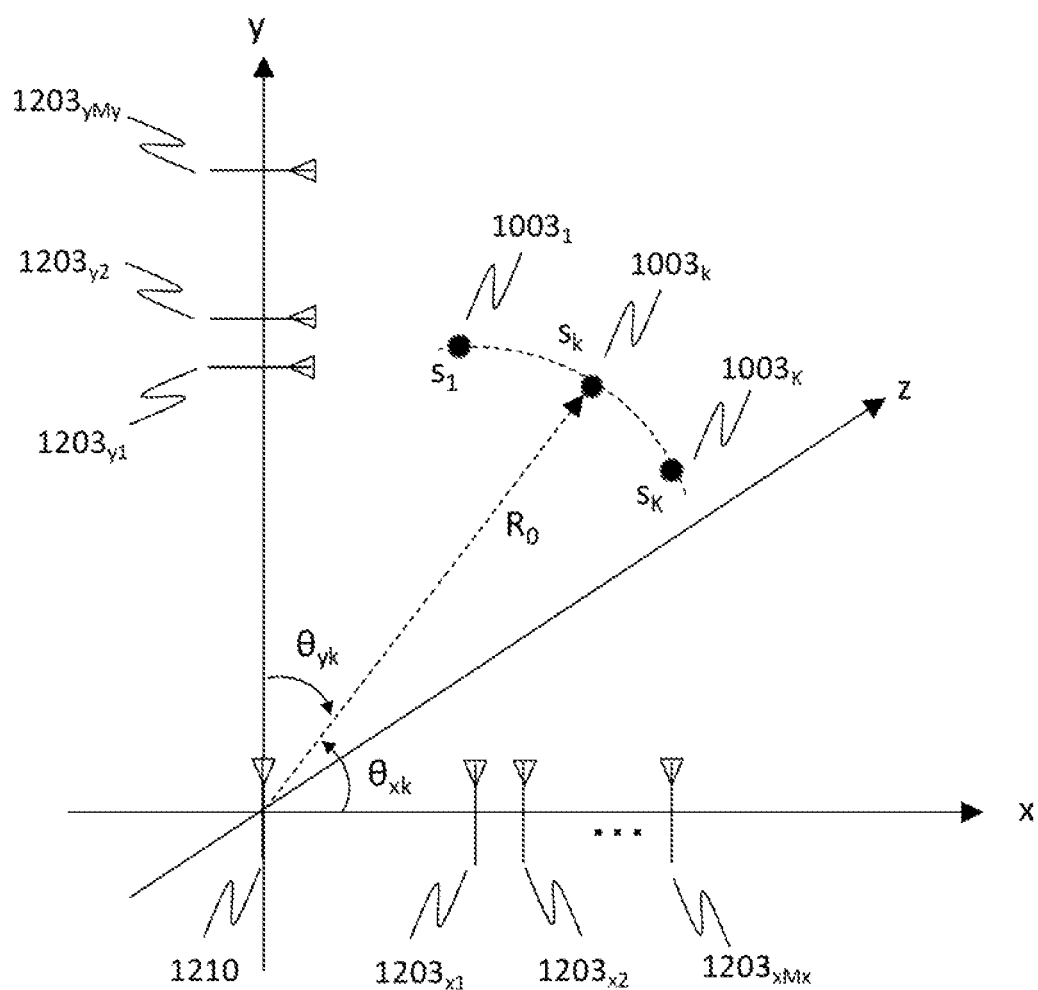
FIG. 10 shows an example of a positional relationship between an object that is a detection target, and a transmission antenna and a receiving antenna for performing detection, in Embodiment 2 of the invention.

As shown in FIG. 10, in this Embodiment 2, the transmission/receiving shared antenna 1210 is installed at the origin point. Also, receiving antennas $1203_{x1}$, $1203_{x2}$, ..., $1203_{xMx}$ are respectively installed on the x-axis, and receiving antennas $1203_{y1}$, $1203_{y2}$, ..., $1203_{yMy}$ are respectively installed on the y-axis.

As described above, in Embodiment 1, the receiving antenna 1203 is arranged only on the x-axis, whereas in this Embodiment 2, the receiving antenna 1203 is arranged not only on the x-axis but also on the y-axis. This Embodiment 2 differs from Embodiment 1 with respect to the arrangement of the receiving antenna.

Also, in the example of FIG. 10, the interval between the transmission/receiving shared antenna 1210 and the receiving antenna $1203_{xm}$ (where m=0, 1, 2, ..., $M_x$) arranged on the x-axis is represented as $\Delta d_{xm}$. Further, the interval between the transmission/receiving shared antenna 1210 and the receiving antenna $1203_{ym}$ (where m=0, 1, 2 ..., $M_y$) arranged on the y-axis is represented as $\Delta d_{ym}$.

Next, in the example shown in FIG. 10, a circumstance is considered in which the target $1003_k$ (where k=1, 2, ..., K) is arranged on a circle with a radius $R_0$ centered on the transmission/receiving shared antenna 1210. Also, it is assumed that a reflected wave from the target $1003_k$ (where k=1, 2, ..., K) is received with the amplitude $s_k$ by each receiving antenna 1203. Also, a vector is assumed that joins the transmission/receiving shared antenna 1210 and the target $1003_k$. The angle formed between the assumed vector and the x-axis is represented as $\theta_{xk}$, and the angle formed between the assumed vector and the y-axis is represented as $\theta_{yk}$.

[Apparatus Operation]

Next, operation of the object detection apparatus according to this Embodiment 2 will be described. In this Embodiment 2 as well, the object detection method is implemented by operating the object detection apparatus. Therefore, the description of the object detection method in this Embodiment 2 also is replaced with the following description of the operation of the object detection apparatus.

Also, in this Embodiment 2 as well, steps A1 to A7 shown in FIG. 8 in Embodiment 1 are executed. However, the details of steps A3 to A7 in this Embodiment 2 are different from those in Embodiment 1. Therefore, the details of steps A3 to A7 in the present embodiment will be described below.

[Step A3]

First, the details of step A3 will be described, in which the respective transmission signals generated by the transmission unit 1101 are mixed with the reception signals received by each receiving antenna 1203, and an IF signal is generated.

In the arrangement shown in FIG. 10, a reference IF signal ($IF_0(t)$) calculated from the reception signal of the transmission/receiving shared antenna 1210 is given by the above Formula (3) disclosed in Embodiment 1.

The measurement IF signal ($IF_{xm}(t)$) calculated from the reception signal of the measurement receiving antenna $1203_{xm}$ (where m=1, 2, . . . , $M_x$) arranged on the x-axis is given by the following Formula (19).

[Formula 19]

$$IF_{xm}(t) = \sum_{k=1}^{K} s_k \exp[-j2\pi(f_{min} + \alpha t)(2R_0 - \Delta d_{xm} \sin \theta_{xk})/c], \quad (19)$$

The measurement IF signal ($IF_{ym}(t)$) calculated from the reception signal of the measurement receiving antenna $1203_{y}$, (where m=1, 2, . . . , $M_y$) arranged on the y-axis is given by the following Formula (20).

[Formula 20]

$$IF_{ym}(t) = \sum_{k=1}^{K} s_k \exp[-j2\pi(f_{min} + \alpha t)(2R_0 - \Delta d_{ym} \sin \theta_{yk})/c], \quad (20)$$

[Step A4]

Next, the details of step A4 will be described, in which the arithmetic device 1211, based on the IF signals obtained from the reception signal of each receiving antenna 1203 in step A3, generates an IF signal such that the distance from the target 1003 to the object detection apparatus is constrained to a specific value.

In the example shown in FIG. 10, the target 1003 is arranged on the spherical target arrangement plane 1005 in which the distance from the transmission/receiving shared antenna 1210 is $R_0$. In an actual circumstance, a target may be present at a position other than on the target arrangement plane 1005 designated by the distance $R_0$. Therefore, in step A4, the arithmetic device 1211 extracts only the signal from the target 1003 present at a position on the target arrangement plane 1005 designated by the distance $R_0$.

For example, it is assumed that the target 1003 is present at the position of the distance $R_0$ on the target arrangement plane 1005. In this case, the reference IF signal ($IF_0(t)$) of Formula (3) generated by the target 1003 has a frequency of $2\alpha R_0/c$. Therefore, if Fourier transformation is performed on the time waveform of the reception IF signal obtained by the reference receiving antenna $1203_0$ or the transmission/receiving shared antenna 1210, and only the frequency signal component of $2\alpha R_0/c$ is extracted, an IF signal is obtained such that the position of the target 1003 is constrained to the desired position (distance range).

The measurement IF signal ($IF_{xm}(t)$) in Formula (19) obtained with the receiving antenna $1203_{xm}$ (where m=1, 2, . . . , $M_x$) arranged on the x-axis has a frequency from $2\alpha(R_0-\Delta_{dxm})/c$ to $2\alpha(R_0+\Delta d_{xm})/c$. Therefore, if Fourier transformation is performed on the time waveform of the measurement IF signal obtained by the measurement receiving antenna $1203_m$ (where m=1, 2, . . . , M), and only the frequency signal component from $2\alpha(R_0-\Delta d_{xm})/c$ to $2\alpha(R_0+\Delta d_{xm})/c$ is extracted, an IF signal is obtained such that the distance value is constrained to $R_0$.

The same is true for the measurement IF signal ($IF_{ym}(t)$) in Formula (19) obtained with the receiving antenna $1203_{ym}$ (where m=1, 2, . . . , $M_y$) arranged on the y-axis. After Fourier transformation, if only the frequency signal component from $2\alpha(R_0-\Delta d_{ym})/c$ to $2\alpha(R_0+\Delta d_{ym})/c$ is extracted, an IF signal constrained to the desired distance range is obtained.

[Step A5]

Next, the details of step A5 will be described, in which the measurement receiving antenna IF signal is normalized according to the reference receiving antenna IF signal, and a normalized IF signal is generated.

In this Embodiment 2, same as in Embodiment 1, the position of the receiving antenna 1203 and the time sampling points are set in accordance with the content disclosed in FIG. 9, respectively with respect to the measurement receiving antenna $1203_{xm}$ (where m=1, 2, . . . , $M_x$) arranged on the x-axis and the measurement receiving antenna $1203_m$ (where m=1, 2, . . . , $M_y$) arranged on the y-axis.

Furthermore, in this Embodiment 2, by dividing the measurement IF signal ($IF_{xm}(t)$) obtained by the measurement receiving antenna $1203_{xm}$ arranged on the x-axis by the reference IF signal ($IF_0(t)$), a normalized IF signal $r_{xm}(t)$ is generated. The normalized IF signal $r_{xm}(t)$ is given by the following Formula (21).

[Formula 21]

$$r_{xm}(t) = IF_{xm}(t)/IF_0(t) = \sum_{k=1}^{K} s'_k \exp[j2\pi(f_{min} + \alpha t)\Delta d_{xm} \sin \theta_{xk}/c], \quad (21)$$

$$s'_k = s_k/S_{tot},$$

Similarly, in this Embodiment 2, by dividing the measurement IF signal ($IF_{ym}(t)$) obtained by the measurement receiving antenna $1203_{ym}$ arranged on the y-axis by the reference IF signal ($IF_0(t)$), a normalized IF signal $r_{ym}(t)$ is generated. The normalized IF signal $r_{ym}(t)$ is given by the following Formula (22).

[Formula 22]

$$r_{ym}(t) = IF_{xm}(t)/IF_0(t) = \sum_{k=1}^{K} s'_k \exp[j2\pi(f_{min} + \alpha t)\Delta d_{ym} \sin \theta_{yk}/c], \quad (22)$$

The normalized IF signal $r_{xm}(t)$ obtained by the receiving antenna $1203_{xm}$ (where m=1, 2, . . . , $M_x$) arranged on the x-axis is acquired at sampling times $t_{(xm,1)}, t_{(xm,2)}, \ldots, t_{(xm,px(m))}$. The number of sampling points of the normalized IF signal obtained by the receiving antenna $1203_{xm}$ is represented by px(m). The sum total $px(1)+px(2)+ \ldots +px(M_x)$ of the number of sampling points of all antennas is represented by $N_x$.

Likewise, the normalized IF signal $r_{ym}(t)$ obtained by the receiving antenna $1203_{ym}$ (where m=1, 2, . . . , $M_y$) arranged on the y-axis is acquired at sampling times $t_{(ym,1)}, t_{(ym,2)}, \ldots, t_{(ym,py(m))}$. The number of sampling points of the normalized IF signal obtained by the receiving antenna $1203_{ym}$ is represented by py(m). The sum total $py(1)+py(2)+ \ldots +py(My)$ of the number of sampling points of all antennas is represented by $N_y$.

A normalized IF signal vector $r_x$ related to the receiving antenna $1203_{xm}$ (where m=1, 2, . . . , $M_x$) arranged on the x-axis is defined as indicated in the following Formula (23). In Formula (23), $r_{xm}(t_{(m,n)})=r_{xm,n}$. This vector $r_x$ is an $N_x$-th order vector.

[Formula 23]

$$r_x = [r_{x1,1}, \ldots, r_{x1,px(1)}, \ldots, r_{xM,1}, \ldots, r_{Mx,px(Mx)}]^T, \quad (23)$$

Likewise, a normalized IF signal vector $r_y$ related to the receiving antenna $1203_{ym}$ (where m=1, 2, ..., $M_y$) arranged on the y-axis is defined as indicated in the following Formula (24). In Formula (24), $r_{ym}(t_{(m,n)}) = r_{ym,n}$. This vector $r_y$ is an $N_y$-th order vector.

[Formula 24]

$$r_y = [r_{y1,1}, \ldots, r_{y1,py(1)}, \ldots, r_{yM,1}, \ldots, r_{My,py(My)}]^T, \quad (24)$$

Note that in the present embodiment, the sum total $N_x$ of the number of sampling points obtained by the receiving antenna $1203_{xm}$ (where m=1, 2, ..., $M_x$) arranged on the x-axis and the sum total $N_y$ of the number of sampling points obtained by the receiving antenna $1203_{ym}$ (where m=1, 2, ..., $M_y$) arranged on the y-axis are preferably equal to each other, and in the following description, $N = N_x = N_y$.

The sampling periods of the normalized IF signals $\tilde{r}_m(t)$ and $r_{ym}(t)$ obtained by the receiving antenna $1203_{xm}$ and the receiving antenna $1203_{ym}$ are represented by $\Delta tx_m$ and $\Delta t_y$, respectively. In order to suppress generation of a virtual image, as in Embodiment 1, the conditions indicated in the following Formula (25) are set for the sampling cycle.

[Formula 25]

$$\Delta t_{xm} \leq \frac{c}{2\alpha \Delta d_{xm}}, \text{ AND } \Delta t_{ym} \leq \frac{c}{2\alpha \Delta d_{ym}}, \quad (25)$$

Also, the conditions indicated in the following Formulas (26) and (27) are set for the position of receiving antennas such that the phase range is continuous between adjacent receiving antennas, as in Embodiment 1.

[Formula 26]

$$f_{max}\Delta d_{xm} \leq f_{min}\Delta d_{x(m+1)}, (m=1,2\ldots,M_x-1) \quad (26)$$

[Formula 27]

$$f_{max}\Delta d_{ym} \leq f_{min}\Delta d_{y(m+1)}, (m=1,2,\ldots,M_y-1) \quad (27)$$

In step A5, the arithmetic device 1211 first performs interpolation processing on each of the measurement IF signal ($IF_{xm}(t)$) obtained by the measurement receiving antenna $1203_{xm}$ arranged on the x-axis and the reference IF signal ($IF_0(t)$). Then, the arithmetic device 1211 calculates a value for sampling times of the sampling cycle $\Delta t_{xm}$ that satisfies above Formula (25). Next, the arithmetic device 1211 aligns the sampling times of the measurement IF signal ($IF_{xm}(t)$) and the reference IF signal ($IF_0(t)$) by interpolation processing, and then divides the measurement IF signal ($IF_m(t)$) by the reference IF signal ($IF_0(t)$) as indicated in above Formula (21) to calculate the normalized IF signal $r_{xm}(t)$ (where m=1, 2, ..., $M_x$).

Similarly, the arithmetic device 1211 performs interpolation processing on each of the measurement IF signal ($IF_{ym}(t)$) obtained by the measurement receiving antenna $1203_{ym}$ arranged on the y-axis and the reference IF signal ($IF_0(t)$). Then, the arithmetic device 1211 calculates a value for sampling times of the sampling cycle $\Delta t_{ym}$ that satisfies above Formula (25). Next, the arithmetic device 1211 aligns the sampling times of the measurement IF signal ($IF_{ym}(t)$) and the reference IF signal ($IF_0(t)$) by interpolation processing, and then divides the measurement IF signal ($IF_{ym}(t)$) by the reference IF signal ($IF_0(t)$) as indicated in above Formula (22) to calculate the normalized IF signal $r_{ym}(t)$ (where m=1, 2, ..., $M_y$).

[Step A6]

Next, the details of step A6 will be described, in which an evaluation function is calculated from a normalized IF signal.

First, in step A6, the arithmetic device 1211 configures respective sub-array vectors from the normalized IF signal vectors $r_x = [r_{x1}, r_{x2}, \ldots, r_{xn}, \ldots, r_{xN}]^T$ and $r_y = [r_{y1}, r_{y2}, \ldots, r_{ym}, \ldots, r_{yN}]^T$ obtained by the receiving antenna $1203_{xm}$ arranged on the x-axis and the receiving antenna $1203_{ym}$ arranged on the y-axis. Specifically, a v-th sub-array is configured with the reception signal of the v-th to v+W−1-th sub-array, that is, $r_{xv} = [r_{xv}, r_{x(v+1)}, \ldots, r_{x(v+w-1)}]^T$ and $r_{yv} = [r_{yv}, r_{y(v+1)}, \ldots, r_{y(v+w-1)}]^T$. W corresponds to the number of sampling points included in each sub-array.

Next, the arithmetic device 1211 takes the direct product of the sub-array vectors $r_{xv}$ and $r_{yv}$ and generates a normalized IF signal $r_{xyv}$ shown in the following Formula (28).

[Formula 28]

$$r_{xyv} = r_{xv} \otimes r_{yv} = [r_{xv}r_{yv}, \ldots, r_{xv}r_{y(v+W-1)}, \ldots, r_{x(v+W-1)}r_{yv}, \ldots, r_{x(v+W-1)}r_{y(v+W-1)}]^T \quad (28)$$

The normalized IF signal $r_{xyv}$ is a ($N^2 \times 1$)-order vector whose element is the product of all combinations of the elements of $r_{xv}$ and $r_{yv}$.

Next, the arithmetic device 1211 calculates the correlation matrix $R_{col(v)}$ calculated from the v-th sub-array as shown in the following Formula (29).

[Formula 29]

$$R_{col(v)} = r_{xyv} \cdot r_{xyv}^H, \quad (29)$$

$R_{all}$ represents the average of the correlation matrix $R_{col(v)}$ (where v=1, 2, ..., V) of all sub-arrays. The number V of sub-arrays is at least the number K of targets.

In the above method, by utilizing the property that the correlation weakens between the reception signals of different sub-arrays, problems caused by the correlation between reflections can be avoided.

Next, the arithmetic device 1211 defines a direction vector $a(\theta_x, \theta_y)$ given by the following Formula (30).

[Formula 30]

$$a(\theta_x, \theta_y) = [\exp(j\varphi_{x1,y1}), \ldots, \exp(j\varphi_{x1,yW}), \ldots, \exp(j\varphi_{xQW,y1}), \ldots, \exp(j\varphi_{xW,yW})]^T, \varphi_{xn,yn}(\theta_x, \theta_y) = 2\pi(f_{min} + \alpha t_{xn})\Delta d_{xm} \sin \theta_x/c + 2\pi(f_{min} + \alpha t_{yn})\Delta d_{yn} \sin \theta_y/c, \quad (30)$$

Also, the times $t_{xn}$ and $t_{ym}$ in the above Formula (30) are sampling times corresponding to the n-th component of the normalized IF signal vectors $r_x$ and $r_y$, respectively. Further, the antenna positions $\Delta d_{mx}$ and $\Delta d_{my}$ change depending on the value of n.

Next, one of the evaluation functions given by Formulas (31) to (33) is calculated.

[Formula 31]

$$P_{BF}(\theta_x, \theta_y) = \frac{a^H(\theta_x, \theta_y) R_{all} a(\theta_x, \theta_y)}{a^H(\theta_x, \theta_y) a(\theta_x, \theta_y)}, \quad (31)$$

(Evaluation Function By Beam Forming Method)

-continued

[Formula 32]

$$P_{CP}(\theta_x, \theta_y) = \frac{1}{a^H(\theta_x, \theta_y)R_{all}^{-1}a(\theta_x, \theta_y)}, \quad (32)$$

(Evaluation Function By Capon Method)

[Formula 33]

$$P_{MU}(\theta_x, \theta_y) = \frac{a^H(\theta_x, \theta_y)a(\theta_x, \theta_y)}{a^H(\theta_x, \theta_y)E_N E_N^H(\theta_x, \theta_y)}, E_N = \lfloor e_{K+1}, \Lambda, e_{W2} \rfloor, \quad (33)$$

(Evaluation Function By MUSIC Method)

The evaluation functions given by Formulas (31) to (33) produce a peak at the angle $(\theta_{xk}, \theta_{yk})$ where the target $1003_k$ (where k=1, 2, ..., K) is present. Therefore, the arithmetic device 1211 can detect the position of the target $1003_k$ from the angle $(\theta_{xk}, \theta_{yk})$ at which the peak of the evaluation function of Formulas (31) to (33) is obtained. Furthermore, the arithmetic device 1211 can estimate the distribution of the reflection intensity $s_k$ for the target $1003_k$ (where k=1, 2, ..., K) from the value of the evaluation function.

The distance $R_0$ of the target $1003k$ and the angle $(\theta_{xk}, \theta_{yk})$ are measured in the processing from step A1 to step A6, so the three-dimensional position of the target $1003_k$ can be calculated from that data.

[Step A7]

Next is a description of step A7. In steps A1 to A6, a presence angle $(\theta_{xk}, \theta_{yk})$ of the target $1003_k$ is calculated after limiting the distance to the specific value $R_0$. Therefore, in step A7, the arithmetic device 1211 determines whether or not processing has been performed with respect to all of the predetermined distances.

If the result of the determination is that processing has not been performed with respect to all distances, the arithmetic device 1211 returns to step A4, changes the limited distance to another value, and then calculates the presence angle $(\theta_{xk}, \theta_{yk})$ of the target $1003_k$. By repeating steps A4 to A7 in this way, the arithmetic device 1211 calculates the presence angle $(\theta_{xk}, \theta_{yk})$ of the target $1003_k$ with respect to all of the predetermined distances.

On the other hand, if the result of the determination is that processing has been performed with respect to all distances, then the arithmetic device 1211 completes the processing from step A4 to step A6. Further, when scanning of the distribution of the target $1003_k$ has been completed with all of the predetermined distances and angles, the object detection apparatus 1000 ends this operation.

[Program]

The program according to this Embodiment 2 may be a program that causes a computer to execute steps A1 to A7 shown in FIG. 7. By installing this program in a computer provided in an object detection apparatus, and executing the program, a processor of the computer functions as the arithmetic device 1211. As a result, the object detection apparatus 1000 and the object detection method according to this Embodiment 2 can be realized.

[Apparatus Performance and Effects in Embodiment 2]

The performance and effects described in Embodiment 1 can be obtained also in this Embodiment 2. Further, according to this Embodiment 2, it is possible to measure the position of the target 1003 in three-dimensional space, so this Embodiment 2 is applicable in more scenes than Embodiment 1.

(Physical Configuration)

Figure 11:
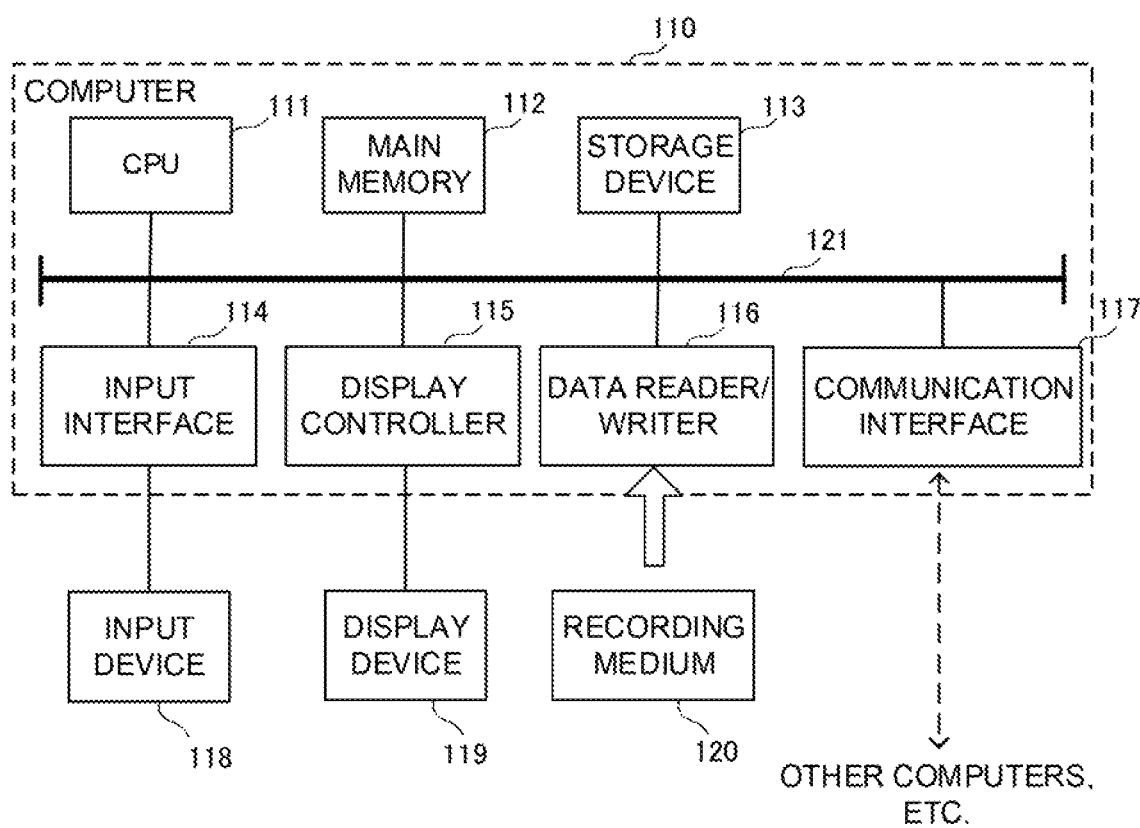
FIG. 11 is a block diagram showing an example of a computer that realizes the object detection apparatus according to Embodiments 1 and 2 of the invention.
Figure 12:
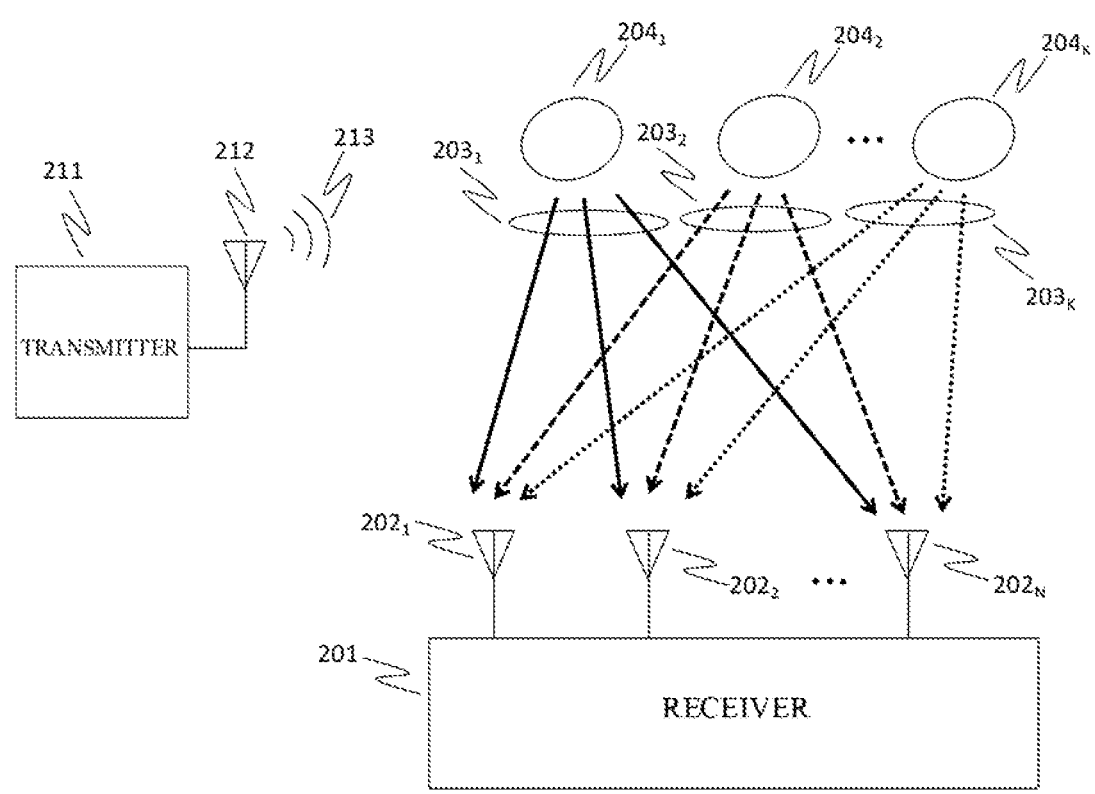
FIG. 12 is a concept diagram showing the concept of a common array antenna system.
Figure 13:
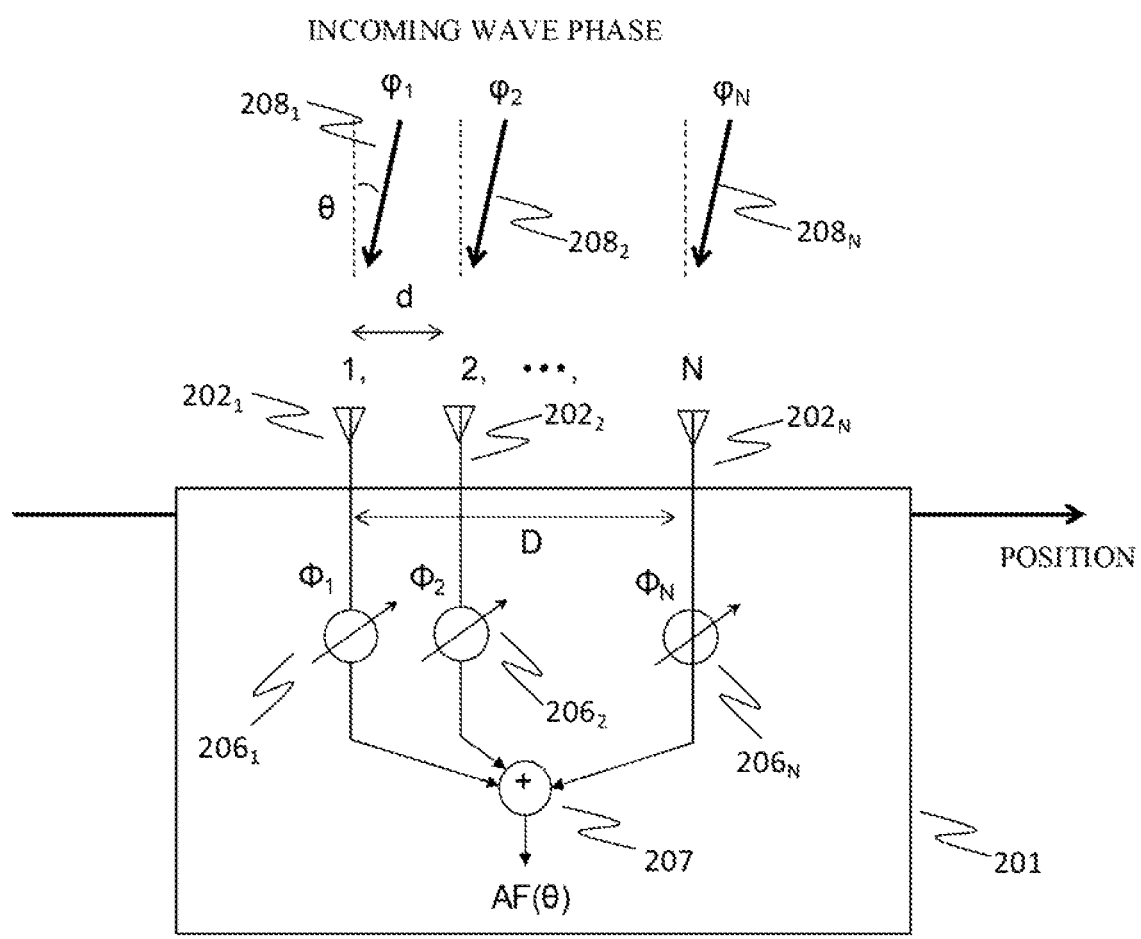
FIG. 13 more specifically shows the configuration of the receiver shown in FIG. 12.

Here, a computer (arithmetic device) that realizes an object detection apparatus by executing the program according to Embodiments 1 and 2 will be described with reference to FIG. 11. FIG. 11 is a block diagram showing an example of a computer that realizes the object detection apparatus according to Embodiments 1 and 2 of the invention.

As shown in FIG. 11, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119. Note that the computer 110 may include a GPU (Graphics Processing Unit) or an FPGA (Field-Programmable Gate Array) in addition to the CPU 111 or in place of the CPU 111.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the object detection apparatus according to this example embodiment can also be realized by using hardware corresponding to each unit. Furthermore, a portion of the object detection apparatus may be realized by a program, and the remaining portion realized by hardware.

Summary of Effects in Embodiments 1 and 2

Following is a summary of the effects in the present embodiments.

When comparing the common array antenna system described in Patent Documents 1 to 3 with these embodiments, the former array antenna system requires a large number of antennas. On the other hand, in the present embodiments, by using sampling data of the time waveform of IF signals as virtual antennas, and replacing actual receiving antennas with these virtual antennas, high resolution can be realized while reducing the number of receiving antennas.

In the conventional system described in Patent Document 4, in which a plurality of pulse signals with different RF frequencies are transmitted and virtual antennas are formed at positions corresponding to the RF frequencies, it is necessary to set a wide range of RF frequencies in order to realize high resolution. However, in this conventional system, there is a problem that it is difficult to realize high resolution because the range of RF frequencies that can be used in the radio wave method is constrained.

On the other hand, in the present embodiments, by using sampling data of the time waveform of IF signals as virtual antennas instead of forming virtual antennas at positions corresponding to the RF frequencies, it is possible to realize high resolution operation even in a circumstance where a wide bandwidth cannot be used for RF signals due to constraints of the radio wave method.

Further, in the conventional system described in Patent Document 4 based on a pulse system, since the bandwidth of the baseband signal is a wide band from several hundred MHz to several GHz, there are the problems that a high sampling rate and a large amount of calculation are required, and that there is signal quality deterioration due to noise. On the other hand, the present embodiments are based on an FMCW system, so the IF signal bandwidth is a narrow band from several tens of kHz to several hundred kHz, and as a result the sampling rate and the amount of calculation are beneficially small, and the problem of signal quality deterioration due to noise can also be avoided.

Figure 14:
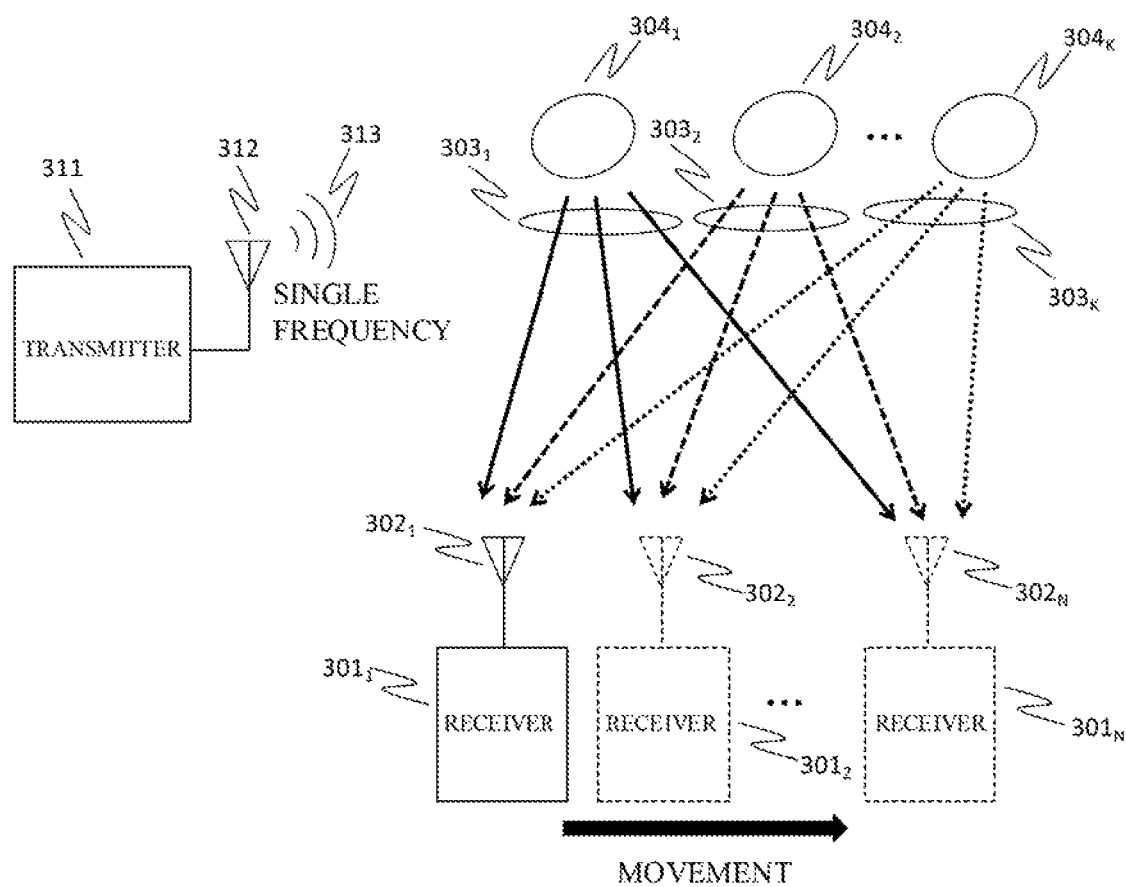
FIG. 14 is a concept diagram showing the concept of a common synthetic aperture radar system.
Figure 15:
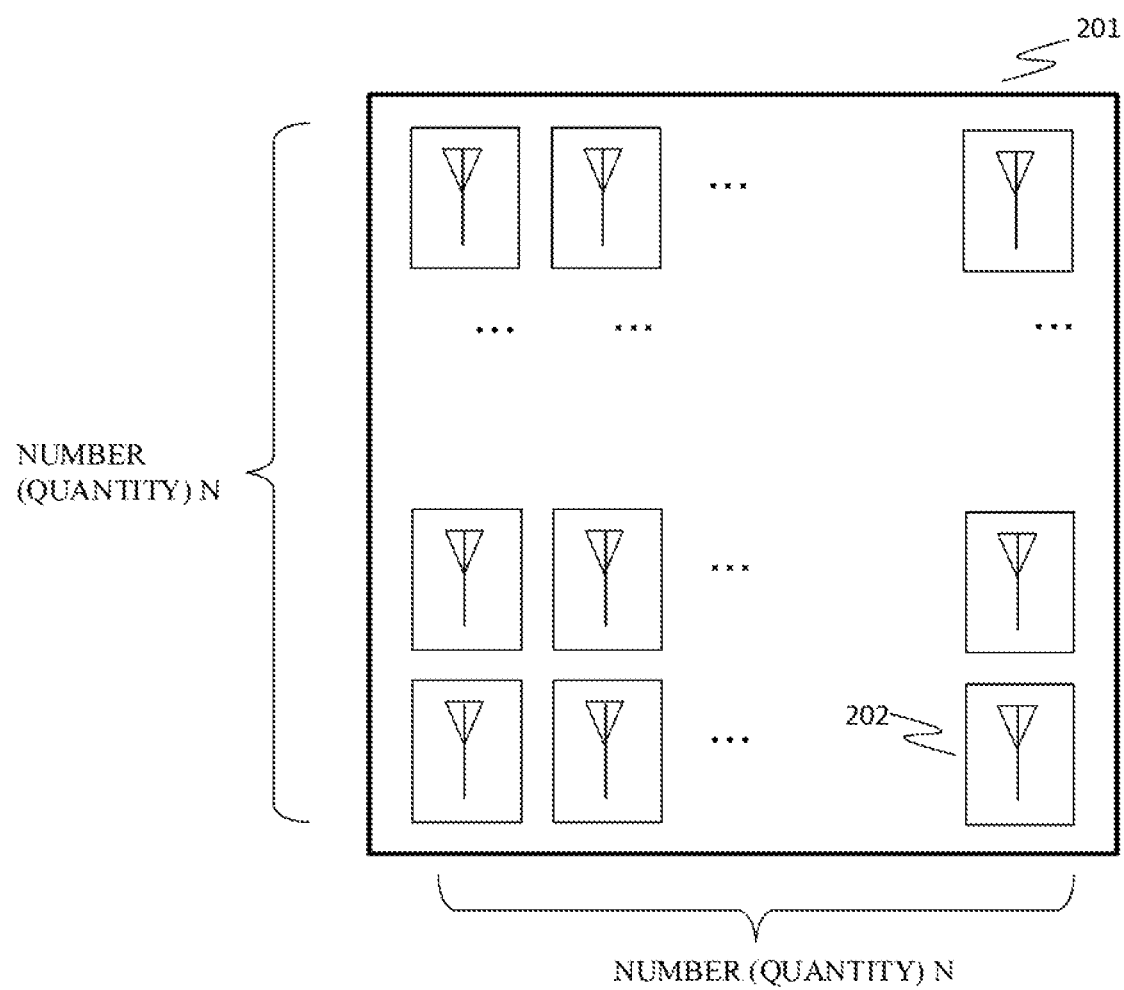
FIG. 15 is a configuration diagram showing an example layout of antennas in an imaging device using a common array antenna system.

When comparing a synthetic aperture radar system with the present embodiments, in a synthetic aperture radar system, it is necessary to mechanically move the receiver 301 (see FIG. 14), and as a result, there is the problem that it takes a long time to detect and inspect an object. On the other hand, in the present embodiments, it is sufficient to electronically scan sampling data of the time waveform of IF signals instead of the position of the receiver, so the time needed to detect and inspect an object can be shortened in comparison to a synthetic aperture radar system. Furthermore, in the present embodiments, a device that mechanically moves antennas is not necessary, so the size of the apparatus can be reduced, and because there is no wear and tear of a mechanism in the case of electronic scanning, compared with mechanical scanning, there is the advantage of being able to improve the useful life of the apparatus and maintenance costs.

That is, in the object detection apparatus and the object detection method according to the present embodiments, the number of required antennas and the number of receivers associated with them can be reduced in comparison to a common array antenna system, so there is the effect that the cost, size, and weight of the apparatus can be reduced. Further, there is the effect that high resolution operation can be realized even in a circumstance where a wide bandwidth cannot be used for RF signals due to constraints of the radio wave method.

Furthermore, there is the effect that the sampling rate of the IF signal and the amount of calculation are suppressed to a small amount, so the problem of signal quality deterioration due to noise can be avoided. Also, in the object detection apparatus and the object detection method according to the present embodiments, unlike a common synthetic aperture radar system, it is not necessary to mechanically move the apparatus, and as a result, there is the effect that it is possible to shorten the time needed to detect and inspect an object.

Some portion or all of the example embodiments described above can be realized according to (supplementary note 1) to (supplementary note 24) described below, but the below description does not limit the invention.

(Supplementary Note 1)

An object detection apparatus for detecting an object with radio waves, the object detection apparatus including:
a transmission unit configured to emit a radio wave as a transmission signal toward the object;
a reception unit configured to receive, through a plurality of receiving antennas, radio waves reflected by the object as reception signals, and to generate, for each reception signal received by the respective plurality of receiving antennas, using the reception signals, an intermediate frequency signal; and
an arithmetic unit configured to decide sampling times so as to suppress generation of a virtual image by a beam pattern obtained by synthesizing the respective intermediate frequency signals, and to generate an intermediate frequency signal for object position detection by performing sampling on the intermediate frequency signals at the decided sampling times, and
to detect the object using the generated intermediate frequency signals for position detection.

(Supplementary Note 2)

The object detection apparatus according to supplementary note 1,
wherein the reception unit includes a reference receiving antenna and a measurement receiving antenna, and
the arithmetic unit is configured to:
execute sampling on an intermediate frequency signal generated from a reception signal received by the measurement receiving antenna and an intermediate frequency signal generated from a reception signal received by the reference receiving antenna;
based on obtained sample values, normalize the intermediate frequency signal generated from the reception signal received by the measurement receiving antenna according to the intermediate frequency signal generated from the reception signal received by the reference receiving antenna, and generates a normalized intermediate frequency signal as the intermediate frequency signal for position detection, and;
calculate an evaluation function that represents a position distribution of the object from the normalized intermediate frequency signal, and using the calculated evaluation function, detects the position and shape of the object.

(Supplementary Note 3)

The object detection apparatus according to supplementary note 2, wherein the arithmetic unit is configured to:
execute processing to limit the position of the object to be detected, on the intermediate frequency signal generated from the reception signal received by the measurement receiving antenna and the intermediate frequency signal generated from the reception signal received by the reference receiving antenna; and
execute the sampling using the intermediate frequency signal on which the processing has been executed.

(Supplementary Note 4)

The object detection apparatus according to supplementary note 2 or 3, wherein the arithmetic unit is configured to;

calculate a correlation matrix from the normalized intermediate frequency signal; and calculate the evaluation function from the calculated correlation matrix.

(Supplementary Note 5)

The object detection apparatus according to supplementary note 4, wherein a plurality of the measurement receiving antennas are provided, and the plurality of measurement receiving antennas are arranged in each of at least two directions with respect to the position of the reference receiving antenna, and the arithmetic unit is configured to:
  generate, for each direction, the normalized intermediate frequency signal from the measurement receiving antenna installed in the corresponding direction;
  further, calculate the correlation matrix from a direct product of the normalized intermediate frequency signal generated for each direction; and calculate the evaluation function that represents a multidimensional position distribution of the object from the calculated correlation matrix.

(Supplementary Note 6)
  wherein the arithmetic unit is configured to:
  select a plurality of ranges of the normalized intermediate frequency signal;
  calculate the correlation matrix from the respective plurality of normalized intermediate frequency signals for which the selected plurality of ranges are prescribed, and further, from an average of the correlation matrix; and
  calculate the evaluation function that represents a position distribution of the object.

(Supplementary Note 7)

The object detection apparatus according to any of supplementary notes 1 to 6,
  wherein the transmission unit is configured to emit a radio wave whose frequency changes over time toward the object as the transmission signal, and
  the reception unit is configured to mix the transmission signal with the reception signal received by each of the receiving antennas to generate the intermediate frequency signal.

(Supplementary Note 8)

The object detection apparatus according to supplementary note 7,
  wherein a plurality of the receiving antennas are provided, and
  an interval between the receiving antennas adjacent to each other is set to be no more than an upper limit value determined by a minimum value and a maximum value of the frequency of the transmission signal.

(Supplementary Note 9)

An object detection method for detecting an object with radio waves, the object detection method including:
  (a) a step of emitting a radio wave as a transmission signal toward the object;
  (b) a step of receiving, through a plurality of receiving antennas, radio waves reflected by the object as reception signals, and generating, for each reception signal received by the respective plurality of receiving antennas, using the reception signals, an intermediate frequency signal;
  (c) a step of deciding sampling times so as to suppress generation of a virtual image by a beam pattern obtained by synthesizing the respective intermediate frequency signals, and generating intermediate frequency signals for object position detection by performing sampling on the intermediate frequency signals at the decided sampling times; and
  (d) a step of detecting the object using the generated intermediate frequency signals for position detection.

(Supplementary Note 10)

The object detection method according to supplementary note 9,
  wherein in the (b) step, a reference receiving antenna and a measurement receiving antenna are used as the receiving antenna,
  in the (c) step,
  sampling is executed on an intermediate frequency signal generated from a reception signal received by the measurement receiving antenna and an intermediate frequency signal generated from a reception signal received by the reference receiving antenna, and
  based on obtained sample values, the intermediate frequency signal generated from the reception signal received by the measurement receiving antenna is normalized according to the intermediate frequency signal generated from the reception signal received by the reference receiving antenna, and a normalized intermediate frequency signal is generated as the intermediate frequency signal for position detection, and
  in the (d) step, an evaluation function that represents a position distribution of the object is calculated from the normalized intermediate frequency signal, and using the calculated evaluation function, the position and shape of the object are detected.

(Supplementary Note 11)

The object detection method according to supplementary note 10,
  wherein in the (c) step,
  processing to limit the position of the object to be detected is executed on the intermediate frequency signal generated from the reception signal received by the measurement receiving antenna and the intermediate frequency signal generated from the reception signal received by the reference receiving antenna, and
  the sampling is executed using the intermediate frequency signal on which the processing has been executed.

(Supplementary Note 12)

The object detection method according to supplementary note 10 or 11,
  wherein in the (d) step, a correlation matrix is calculated from the normalized intermediate frequency signal, and the evaluation function is calculated from the calculated correlation matrix.

(Supplementary Note 13)

The object detection method according to supplementary note 12,
  wherein a plurality of the measurement receiving antennas are provided, and the plurality of measurement receiving antennas are arranged in each of at least two directions with respect to the position of the reference receiving antenna, and
  in the (c) step, for each direction, the normalized intermediate frequency signal is generated from the measurement receiving antenna installed in the corresponding direction, and
  in the (d) step, the correlation matrix is calculated from a direct product of the normalized intermediate frequency signal generated for each direction, and then the evaluation function that represents a multidimensional position distribution of the object is calculated from the calculated correlation matrix.

(Supplementary Note 14)

The object detection method according to supplementary note 12 or 13, wherein in the (d) step, a plurality of ranges of the normalized intermediate frequency signal are selected, the correlation matrix is calculated from the respective plurality of normalized intermediate frequency signals for which the selected plurality of ranges are prescribed, and further, from an average of the correlation matrix, the evaluation function that represents a position distribution of the object is calculated.

(Supplementary Note 15)

The object detection method according to any of supplementary notes 9 to 14, wherein in the (a) step, a radio wave whose frequency changes over time is emitted toward the object as the transmission signal, and in the (b) step, the transmission signal is mixed with the reception signal received by each of the receiving antennas to generate the intermediate frequency signal.

(Supplementary Note 16)

The object detection method according to supplementary note 15, wherein a plurality of the receiving antennas are provided, and in the (b) step, an interval between the receiving antennas adjacent to each other is set to be no more than an upper limit value determined by a minimum value and a maximum value of the frequency of the transmission signal.

(Supplementary Note 17)

A computer-readable recording medium including, in an object detection apparatus including a transmission unit configured to emit a radio wave as a transmission signal toward an object, a reception unit configured to receive, through a plurality of receiving antennas, radio waves reflected by the object as reception signals, and to generate, for each reception signal received by the respective plurality of receiving antennas, using the reception signals, an intermediate frequency signal, and a computer, a program recorded on the computer-readable recording medium, the program including instructions that cause the computer to carry out:

(a) a step of deciding sampling times so as to suppress generation of a virtual image by a beam pattern obtained by synthesizing the respective intermediate frequency signals, and generating intermediate frequency signals for object position detection by performing sampling on the intermediate frequency signals at the decided sampling times; and (b) a step of detecting the object using the generated intermediate frequency signals for position detection.

(Supplementary Note 18)

The computer-readable recording medium according to supplementary note 17, wherein the reception unit includes a reference receiving antenna and a measurement receiving antenna as the receiving antenna, in the (a) step, sampling is executed on an intermediate frequency signal generated from a reception signal received by the measurement receiving antenna and an intermediate frequency signal generated from a reception signal received by the reference receiving antenna, and based on obtained sample values, the intermediate frequency signal generated from the reception signal received by the measurement receiving antenna is normalized according to the intermediate frequency signal generated from the reception signal received by the reference receiving antenna, and a normalized intermediate frequency signal is generated as the intermediate frequency signal for position detection, and in the (b) step, an evaluation function that represents a position distribution of the object is calculated from the normalized intermediate frequency signal, and using the calculated evaluation function, the position and shape of the object are detected.

(Supplementary Note 19)

The computer-readable recording medium according to supplementary note 18, wherein in the (a) step, processing to limit the position of the object to be detected is executed on the intermediate frequency signal generated from the reception signal received by the measurement receiving antenna and the intermediate frequency signal generated from the reception signal received by the reference receiving antenna, and the sampling is executed using the intermediate frequency signal on which the processing has been executed.

(Supplementary Note 20)

The computer-readable recording medium according to supplementary note 18 or 19, wherein in the (b) step, a correlation matrix is calculated from the normalized intermediate frequency signal, and the evaluation function is calculated from the calculated correlation matrix.

(Supplementary Note 21)

The computer-readable recording medium according to supplementary note 20, wherein a plurality of the measurement receiving antennas are provided, and the plurality of measurement receiving antennas are arranged in each of at least two directions with respect to the position of the reference receiving antenna, and in the (a) step, for each direction, the normalized intermediate frequency signal is generated from the measurement receiving antenna installed in the corresponding direction, and in the (b) step, the correlation matrix is calculated from a direct product of the normalized intermediate frequency signal generated for each direction, and then the evaluation function that represents a multidimensional position distribution of the object is calculated from the calculated correlation matrix.

(Supplementary Note 22)

The computer-readable recording medium according to supplementary note 20 or 21, wherein in the (b) step, a plurality of ranges of the normalized intermediate frequency signal are selected, the correlation matrix is calculated from the respective plurality of normalized intermediate frequency signals for which the selected plurality of ranges are prescribed, and further, from an average of the correlation matrix, the evaluation function that represents a position distribution of the object is calculated.

(Supplementary Note 23)

The computer-readable recording medium according to any of supplementary notes 17 to 22, wherein the transmission unit emits a radio wave whose frequency changes over time toward the object as the transmission signal, and the reception unit mixes the transmission signal with the reception signal received by each of the receiving antennas to generate the intermediate frequency signal.

(Supplementary Note 24)

The computer-readable recording medium according to supplementary note 23,
wherein a plurality of the receiving antennas are provided, and
an interval between the receiving antennas adjacent to each other is set to be no more than an upper limit value determined by a minimum value and a maximum value of the frequency of the transmission signal.

The configuration of exemplary embodiments of the present invention has been described above. However, the contents disclosed in the above-mentioned patent documents and the like can also be incorporated into the invention by reference. Modifications and adjustments of the exemplary embodiments are possible within the scope of the overall disclosure (including the claims) of the invention and based on the basic technical concepts thereof.

Also, various combinations or selections of various disclosed elements are possible within the scope of the claims of the invention. In other words, the invention of course includes various variations and modifications that can be made by those skilled in the art according to the overall disclosure including the claims and the technical concepts thereof.

Furthermore, the present invention is not limited to the above example embodiments. Within the scope of the present invention, various modifications that can be understood by those skilled in the art can be made to the configuration and details of the present invention.

INDUSTRIAL APPLICABILITY

As described above, according to the invention, in imaging of an object using radio waves, while suppressing deterioration of image quality, it is possible to reduce the cost and size of the apparatus. The present invention is useful in radar devices, imaging devices for inspecting objects under clothes and in bags, and the like.

REFERENCE SIGNS LIST

110 Computer
111 CPU
112 Main memory
113 Storage device
114 Input interface
115 Display controller
116 Data reader/writer
117 Communications interface
118 Input device
119 Display device
120 Recording medium
121 Bus

The invention claimed is:

1. An object detection apparatus for detecting an object with radio waves, the object detection apparatus comprising:
a transmission unit configured to emit a radio wave as a transmission signal toward the object;
a reception unit configured to receive, through a plurality of receiving antennas, radio waves reflected by the object as reception signals, and to generate, for each reception signal received by the respective plurality of receiving antennas, based on the reception signals, an intermediate frequency signal, wherein the reception unit includes a reference receiving antenna and a measurement receiving antenna; and
an arithmetic unit configured to decide sampling times so as to suppress generation of a virtual image by a beam pattern obtained by synthesizing the respective intermediate frequency signals, and execute sampling on a first intermediate frequency signal generated from a reception signal received by the measurement receiving antenna and a second intermediate frequency signal generated from a reception signal received by the reference receiving antenna,
based on obtained sample values, normalize the intermediate frequency signal generated from the reception signal received by the measurement receiving antenna according to the intermediate frequency signal generated from the reception signal received by the reference receiving antenna, and generates a normalized intermediate frequency signal as the intermediate frequency signal for position detection, and
calculate an evaluation function that represents a position distribution of the object from the normalized intermediate frequency signal, and based on the evaluation function, detects the position and shape of the object.

2. The object detection apparatus according to claim 1, wherein the arithmetic unit is configured to:
execute processing to limit the position of the object to be detected, on the intermediate frequency signal generated from the reception signal received by the measurement receiving antenna and the intermediate frequency signal generated from the reception signal received by the reference receiving antenna, and
execute the sampling based on the intermediate frequency signal on which the processing has been executed.

3. The object detection apparatus according to claim 1, wherein the arithmetic unit is configured to:
calculate a correlation matrix from the normalized intermediate frequency signal; and
calculate the evaluation function from the correlation matrix.

4. The object detection apparatus according to claim 3,
wherein the measurement receiving antenna is included in a plurality of measurement receiving antennas, and the plurality of measurement receiving antennas are arranged in each of at least two directions with respect to the position of the reference receiving antenna, and
the arithmetic unit is configured to:
generate, for each direction, the normalized intermediate frequency signal from the measurement receiving antenna installed in the corresponding direction;
further, calculate the correlation matrix from a direct product of the normalized intermediate frequency signal generated for each direction; and
calculate the evaluation function that represents a multi-dimensional position distribution of the object from the correlation matrix.

5. The object detection apparatus according to claim 3,
wherein the normalized intermediate frequency signal is included in a plurality of normalized intermediate frequency signals,
the arithmetic unit is further configured to:
select a plurality of ranges of the normalized intermediate frequency signal;
calculate the correlation matrix from the respective plurality of normalized intermediate frequency signals for which the plurality of ranges are prescribed, and further, from an average of the correlation matrix; and calculate the evaluation function that represents a position distribution of the object.

6. The object detection apparatus according to claim 1, wherein the transmission unit is configured emit a radio wave whose frequency changes over time toward the object as the transmission signal, and the reception unit is configured mix the transmission signal with the reception signal received by each of the receiving antennas to generate the intermediate frequency signal.

7. The object detection apparatus according to claim 6, wherein a plurality of the receiving antennas are provided, and an interval between the receiving antennas adjacent to each other is set to be no more than an upper limit value determined by a minimum value and a maximum value of the frequency of the transmission signal.

8. An object detection method, performed by an object detection apparatus, for detecting an object with radio waves, the object detection method comprising:

emitting a radio wave as a transmission signal toward the object;

receiving, through a plurality of receiving antennas, radio waves reflected by the object as reception signals, and generating, for each reception signal received by the respective plurality of receiving antennas, based on the reception signals, an intermediate frequency signal, wherein a reference receiving antenna and a measurement receiving antenna are used as the receiving antennas;

deciding sampling times so as to suppress generation of a virtual image by a beam pattern obtained by synthesizing the respective intermediate frequency signals, and performing sampling on the intermediate frequency signals at the decided sampling times wherein the sampling is executed on a first intermediate frequency signal generated from a reception signal received by the measurement receiving antenna and a second intermediate frequency signal generated from a reception signal received by the reference receiving antenna, and based on obtained sample values, the intermediate frequency signal generated from the reception signal received by the measurement receiving antenna is normalized according to the intermediate frequency signal generated from the reception signal received by the reference receiving antenna, and a normalized intermediate frequency signal is generated as the intermediate frequency signal for position detection, and when the object is detected, an evaluation function that represents a position distribution of the object is calculated from the normalized intermediate frequency signal, and based on the evaluation function, the position and shape of the object are detected.

9. The object detection method according to claim 8, wherein when the intermediate frequency signals for position detection are generated, processing to limit the position of the object to be detected is executed on the intermediate frequency signal generated from the reception signal received by the measurement receiving antenna and the intermediate frequency signal generated from the reception signal received by the reference receiving antenna, and the sampling is executed based on the intermediate frequency signal on which the processing has been executed.

10. The object detection method according to claim 8, wherein when the object is detected, a correlation matrix is calculated from the normalized intermediate frequency signal, and the evaluation function is calculated from the correlation matrix.

11. The object detection method according to claim 10, wherein the measurement receiving antenna is included in a plurality of measurement receiving antennas, and the plurality of measurement receiving antennas are arranged in each of at least two directions with respect to the position of the reference receiving antenna, and when the intermediate frequency signals for position detection are generated, for each direction, the normalized intermediate frequency signal is generated from the measurement receiving antenna installed in the corresponding direction, and when the object is detected, the correlation matrix is calculated from a direct product of the normalized intermediate frequency signal generated for each direction, and then the evaluation function that represents a multidimensional position distribution of the object is calculated from the correlation matrix.

12. The object detection method according to claim 10, wherein the normalized intermediate frequency signal is included in a plurality of normalized intermediate frequency signals, when the object is detected, a plurality of ranges of the normalized intermediate frequency signal are selected, the correlation matrix is calculated from the respective plurality of normalized intermediate frequency signals for which the plurality of ranges are prescribed, and further, from an average of the correlation matrix, the evaluation function that represents a position distribution of the object is calculated.

13. A non-transitory computer-readable recording medium including, in an object detection apparatus including a transmission unit configured to emit a radio wave as a transmission signal toward an object, a reception unit configured to receive, through a plurality of receiving antennas, radio waves reflected by the object as reception signals, and to generate, for each reception signal received by the respective plurality of receiving antennas, based on the reception signals, an intermediate frequency signal, and a computer, wherein the reception unit includes a reference receiving antenna and a measurement receiving antenna as the receiving antenna, a program recorded on the non-transitory computer-readable recording medium, the program including instructions that cause the computer to carry out:

deciding sampling times so as to suppress generation of a virtual image by a beam pattern obtained by synthesizing the respective intermediate frequency signals, and performing sampling on the intermediate frequency signals at the decided sampling times wherein the sampling is executed on a first intermediate frequency signal generated from a reception signal received by the measurement receiving antenna and a second intermediate frequency signal generated from a reception signal received by the reference receiving antenna, and based on obtained sample values, the intermediate frequency signal generated from the reception signal received by the measurement receiving antenna is normalized according to the intermediate frequency signal generated from the reception signal received by the reference receiving antenna, and a normalized intermediate frequency signal is generated as the intermediate frequency signal for position detection, and when the object is detected, an evaluation function that represents a position distribution of the object is calculated from the normalized intermediate frequency signal, and based on the evaluation function, the position and shape of the object are detected.

14. The non-transitory computer-readable recording medium according to claim 13, wherein when the intermediate frequency signals for position detection are generated, processing to limit the position of the object to be detected is executed on the intermediate frequency signal generated from the reception signal received by the measurement receiving antenna and the intermediate frequency signal generated from the reception signal received by the reference receiving antenna, and the sampling is executed based on the intermediate frequency signal on which the processing has been executed.

15. The non-transitory computer-readable recording medium according to claim 13, wherein when the object is detected, a correlation matrix is calculated from the normalized intermediate frequency signal, and the evaluation function is calculated from the correlation matrix.

16. The non-transitory computer-readable recording medium according to claim 15, wherein the measurement receiving antenna is included in a plurality of measurement receiving antennas, and the plurality of measurement receiving antennas are arranged in each of at least two directions with respect to the position of the reference receiving antenna, and when the intermediate frequency signals for position detection are generated, for each direction, the normalized intermediate frequency signal is generated from the measurement receiving antenna installed in the corresponding direction, and when the object is detected, the correlation matrix is calculated from a direct product of the normalized intermediate frequency signal generated for each direction, and then the evaluation function that represents a multidimensional position distribution of the object is calculated from the correlation matrix.

17. The non-transitory computer-readable recording medium according to claim 15, wherein the normalized intermediate frequency signal is included in a plurality of normalized intermediate frequency signals, when the object is detected, a plurality of ranges of the normalized intermediate frequency signal are selected, the correlation matrix is calculated from the respective plurality of normalized intermediate frequency signals for which the plurality of ranges are prescribed, and further, from an average of the correlation matrix, the evaluation function that represents a position distribution of the object is calculated.

* * * * *